US012693522B2

(12) United States Patent
Zhou et al.

(10) Patent No.: US 12,693,522 B2
(45) Date of Patent: Jul. 28, 2026

(54) FREEFORM EYEPIECE

(71) Applicant: Texas Instruments Incorporated, Dallas, TX (US)

(72) Inventors: Xi Zhou, PLano, TX (US); Zhongyan Sheng, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 334 days.

(21) Appl. No.: 18/343,172

(22) Filed: Jun. 28, 2023

(65) Prior Publication Data
US 2024/0094523 A1 Mar. 21, 2024

Related U.S. Application Data

(60) Provisional application No. 63/376,119, filed on Sep. 19, 2022.

(51) Int. Cl.
| | |
|---|---|
| *G02B 25/00* | (2006.01) |
| *G02B 17/08* | (2006.01) |
| *G02B 27/01* | (2006.01) |

(52) U.S. Cl.
CPC ....... *G02B 25/001* (2013.01); *G02B 17/0856* (2013.01); *G02B 27/0172* (2013.01)

(58) Field of Classification Search
CPC ............. G02B 25/001; G02B 27/0172; G02B 17/0856; G02B 2027/011; G02B 2027/0123; G02B 2027/0178
See application file for complete search history.

(56) References Cited

U.S. PATENT DOCUMENTS

| | | | | |
|---|---|---|---|---|
| 2003/0197943 A1* | 10/2003 | Yamazaki | ............ | G02B 17/086 |
| | | | | 359/631 |
| 2014/0293434 A1* | 10/2014 | Cheng | .................. | H04N 13/363 |
| | | | | 359/630 |
| 2020/0081176 A1* | 3/2020 | Bartlett | .............. | G02B 27/4205 |
| 2021/0096338 A1* | 4/2021 | Saiga | ................. | G02B 17/0832 |
| 2021/0302746 A1* | 9/2021 | Gao | ................... | G02B 27/0172 |

* cited by examiner

*Primary Examiner* — Priyank J Shah
(74) *Attorney, Agent, or Firm* — Michael T. Gabrik; Frank D. Cimino

(57) ABSTRACT
In one example, an eyepiece has a one-piece shape that is solid and rotationally asymmetric. The eyepiece includes first, second and third surfaces at least partially defining the one-piece shape. The first surface is configured to receive a spatially modulated light beam. The second surface is configured to internally reflect the spatially modulated light beam toward the third surface. The third surface is configured to reflect the spatially modulated light beam toward and through the second surface. Transmission of the spatially modulated light beam through the second surface concentrates the spatially modulated light beam.

20 Claims, 20 Drawing Sheets

710

PERCENT

700

µm

+Y

810

PERCENT

800

MILLIMETERS

+X

910

PERCENT

900

MILLIMETERS

+X

1010

PERCENT

1000

+Y

MILLIMETERS

FREEFORM EYEPIECE

RELATED APPLICATION

This application claims priority to U.S. Provisional Application Ser. No. 63/376,119, entitled "Freeform AR Eyepiece for DLP Near Eye Display," filed Sep. 19, 2022, which is hereby incorporated by reference herein in its entirety.

BACKGROUND

Near eye display (NED) systems include personal imaging systems that create an image in the field of view of one or both a viewer's eyes. Unlike imaging systems that project an image onto a screen or surface for viewing, certain NED systems project the image from a viewing area on a lens onto the human retina, where the image is perceived to be in front of the viewer. The distance from a viewing pupil on the lens to the viewer's eye may be only a few millimeters. Many NED systems are provided in wearable portable devices, resembling eyeglasses or goggles.

Some NED systems are virtual reality (VR) systems, in which an immersive viewing experience enables the viewer to see only the image projected by the system, while the immersive viewing system blocks light from other sources. VR systems may be used, for example, in gaming, simulators, training systems, or virtual 2D or 3D viewing for movies, games, or video presentations. Certain alternative systems that use NED are transmissive systems, where lenses act as optical combiners. In such alternative systems, the viewer looks through the lens of the NED, and the lens optically combines the images provided by the system with the scene the viewer is observing. Examples are augmented reality (AR) systems. Some NED systems are mixed reality (XR) systems, in which an immersive viewing experience enables the viewer to see only the image projected by the system, while the immersive viewing system also uses cameras to also project virtual renderings of objects in the real world.

SUMMARY

In one example, an eyepiece has a one-piece shape that is solid and rotationally asymmetric. The eyepiece includes first, second and third surfaces at least partially defining the one-piece shape. The first surface is configured to receive a spatially modulated light beam. The second surface is configured to internally reflect the spatially modulated light beam toward the third surface. The third surface is configured to reflect the spatially modulated light beam toward and through the second surface. Transmission of the spatially modulated light beam through the second surface concentrates the spatially modulated light beam.

In another example, a display system includes a light source, a spatial light modulator (SLM), a total internal reflection (TIR) prism, a freeform eyepiece, and a waveguide. The light source is configured to emit a light beam. The spatial light modulator is optically coupled to the light source and configured to receive and spatially modulate the light beam. The TIR prism is optically coupled to the spatial light modulator and configured to receive and redirect the spatially modulated light beam. The freeform eyepiece has a one-piece, solid, rotationally-asymmetric shape including first, second, and third surfaces. The freeform eyepiece is optically coupled to the TIR prism and configured to: receive through the first surface the spatially modulated light beam redirected by the TIR prism; internally reflect the spatially modulated light beam off the second surface toward the third surface; internally reflect the spatially modulated light beam off the third surface toward the second surface; and transmit the spatially modulated light beam through the second surface. The transmission of the spatially modulated light beam through the second surface concentrates the spatially modulated light beam. The waveguide is optically coupled to the freeform eyepiece and configured to receive the light beam transmitted by the freeform eyepiece and transmit the received light beam to a reflective surface of a wearable eye lens.

In another example, a display system includes a TIR prism configured to receive and redirect a light beam; a spatial light modulator optically coupled to the TIR prism and configured to receive and spatially modulate the light beam redirected by the TIR prism; and a freeform eyepiece having a one-piece, solid, rotationally-asymmetric shape including first, second, and third surfaces. The freeform eyepiece is optically coupled to the spatial light modulator and configured to: receive through the first surface the spatially modulated light beam; internally reflect the spatially modulated light beam off the second surface toward the third surface; internally reflect the spatially modulated light beam off the third surface toward the second surface; and transmit the spatially modulated light beam through the second surface, the transmission of the spatially modulated light beam through the second surface concentrating the spatially modulated light beam.

BRIEF DESCRIPTION OF THE DRAWINGS

The same reference numbers or other reference designators are used in the drawings to designate the same or similar (functionally and/or structurally) features. Also, the figures are not necessarily drawn to scale.

DETAILED DESCRIPTION

Figure 1A:
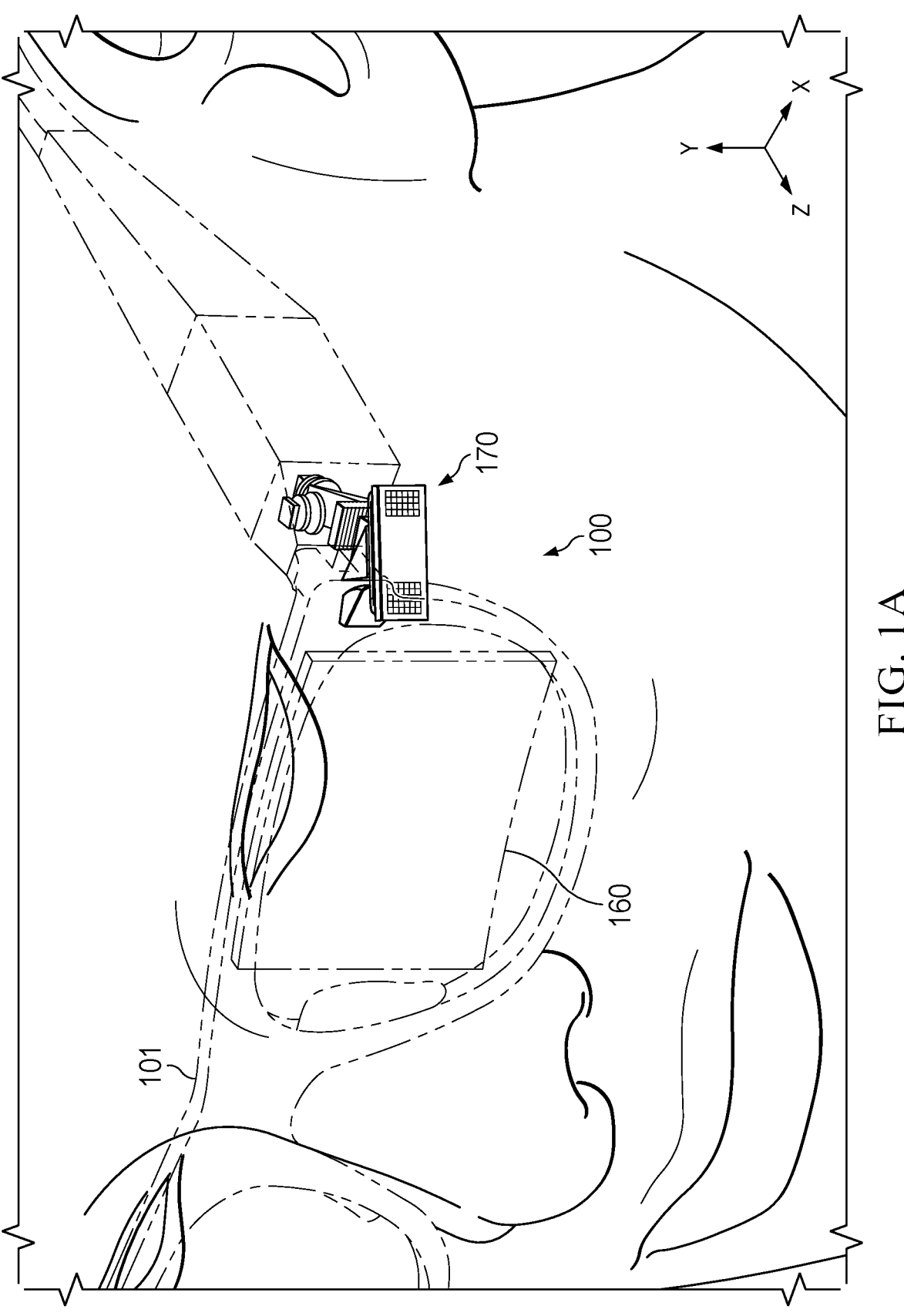
FIGS. 1A-1C are perspective views of a portion of an NED system.
Figure 1B:
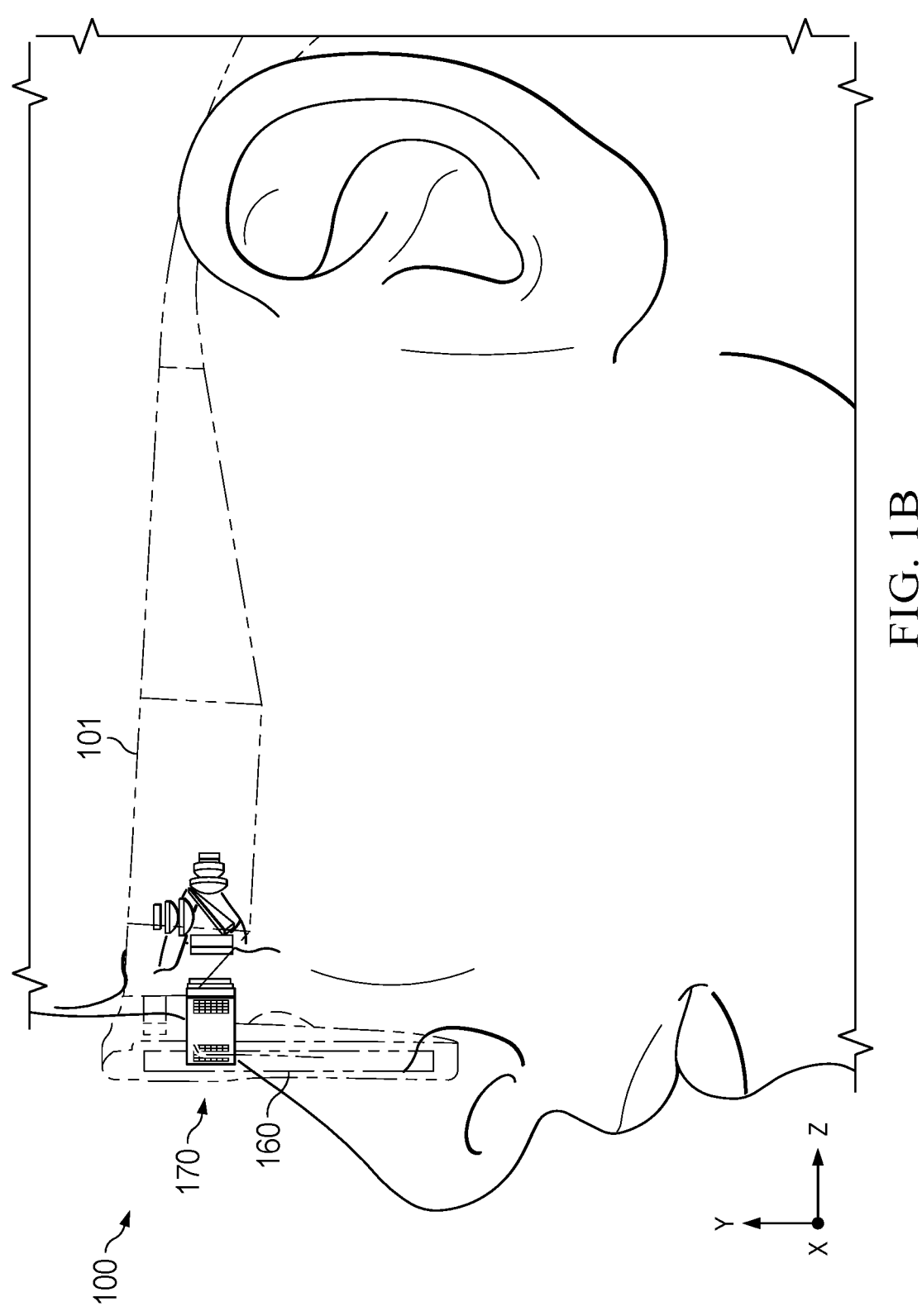
Figure 1C:
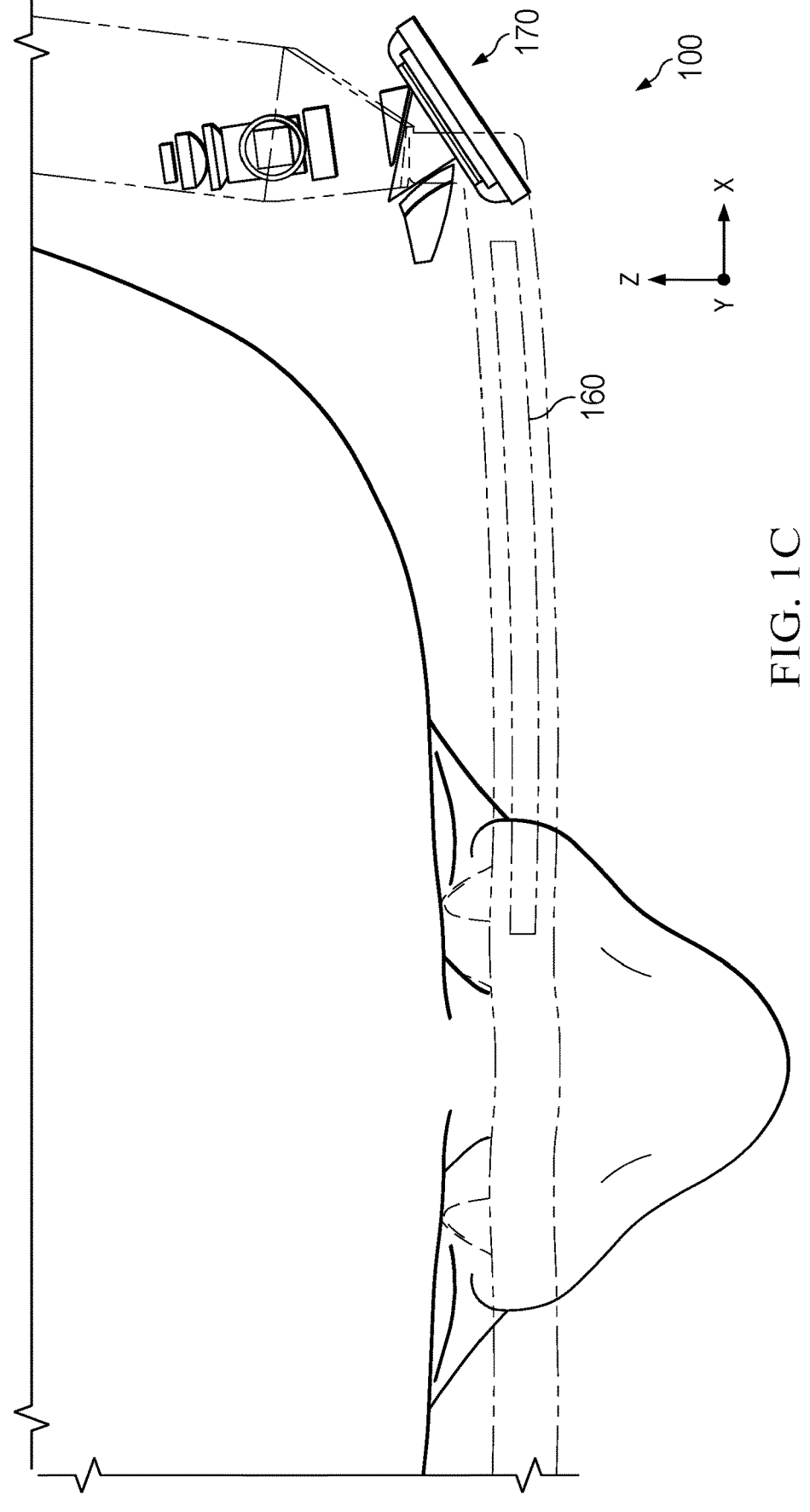

FIGS. 1A-1C are perspective views of a portion of a near eye display (NED) system 100 mounted to a wearable headset or eye glass(es) 101, such that NED system 100 is itself a wearable NED system. NED system 100 includes a projector subsystem 170 configured to provide light beams containing display information. In some systems, the projector subsystem 170 may include one or more illumination sources and one or more spatial light modulators (SLM) or other display panels that collectively operate to provide the display information from a video data source.

NED system 100 further includes one or more optical components configured to direct light beams provided by the projector subsystem 170 to the retina(s) of a user. The optical components may include, for example, one or more lenses, mirrors, prisms, waveguides, etc. In some systems, a transmissive eye glass lens includes a waveguide within the lens (e.g., waveguide 160 of FIGS. 1A-1C).

The waveguide (or pair of waveguides) may have a transmissive lens positioned in proximity to a user's eye(s). A waveguide may operate to direct light beams toward a user's retina. The light beams directed by a waveguide may contain display information, as received from the optical component(s) positioned in the light path between the lens and the projector subsystem 170. In certain AR applications, from the perspective of the user, the display information provided by NED system 100 is optically combined with the scene being viewed through a waveguide lens may be perceived as virtual objects in the distance.

A variety of visual information, cues, or aids may be displayed by NED system 100. For example, notifications can be displayed and viewed along with a scene being observed. Examples of such notifications include social media messages, text including navigation information, weather, traffic, historical or tourism information about an object or place, retail offers such as sales or advertising related to a store or place near to or being viewed by a user, stock quotes, sports scores or other context driven notifications or information. Some systems may enable interactive gaming, such as scavenger hunts or games involving finding virtual objects at a location, or games scoring the user's ability to find a target place or object. Some systems may enable battle simulations in either a gaming or military training context, in which a virtual object, such as a drone or a person, is perceived as entering a field of view at a certain vector and as continuing to realistically travel through the field of view even while the user's gaze is adjusted.

NED system 100 can include one or more processors and can include network connections, such as cellular connections, Wi-Fi connections, Bluetooth connections, or the display system can be coupled to another device including such connections, such as a smartphone, tablet, portable web browser, video player, or laptop computer. Some AR systems provide a full field of view display that is always in the view of the user, while other AR systems may provide a small display provided at a portion of the view that the user must specifically look at to see, such as smart glasses.

In some systems, a user wears a headset or eyeglass(es) 101 in a manner similar to sunglasses, eyeglasses, or monocle, and NED system 100 displays information that augments the real visual environment observed by the user while wearing the device. In other systems, such as an automotive or aerospace heads-up displays (HUD), the user looks into the NED system 100, and the imaging system adds images to the scene in front of the user. In this way, the user can observe a scene while receiving additional information at the same time, such as vehicle speed, fuel gauges, system messages, and similar data.

Certain wearable headset or glasses are quite bulky in order to accommodate the physical space needed to house NED system components. Accordingly, certain wearable headset or glasses can become heavy and uncomfortable to the user. For example, the user can experience chafing or injury to nose and ear areas that support the glasses or headset when the glasses or headset are worn over a period of time. An increase in overall volume or weight may be needed to house certain specialized NED system components, such as certain reflective spatial light modulators.

NED system 100 may be implemented as a compact design that enables reducing the overall weight and volume of NED system 100, while achieving certain design constraints that may be required for certain AR or VR applications or products. For example, from an optics perspective, NED system 100 may be configured to provide display information capable of achieving certain resolution targets and a desired angular field of view (FOV) (e.g., from 30 to 50 degrees) from the perspective of a human pupil. As another example, NED system 100 may be configured to achieve certain volume, weight, and form factors for NED system 100 overall. This may enable certain user scenarios for NED system 100, such as, for example, improved user comfort in continually wearing a headset or eyeglass(es) 101 containing NED system 100 for prolonged periods of time.

FIGS. 2A-2E are perspective views of example optical components that may be used by the NED system 100 of FIGS. 1A-1C. In this example, the optical components of NED system 100 include: light sources 102A-102B, a first lens system 104, a second lens system 106, a first total internal reflection (TIR) prism 108, a second TIR prism 110, a spatial light modulator (SLM) 120, and a freeform eyepiece 150. The optical components 102A-150 are optically coupled to one another along path of a light beam and collectively operate to control the path of a light beam. In this example the path of the controlled light beam includes at least light path segments (a)-(e).

In this description, elements that are "optically coupled" have an optical connection between the elements, but various intervening optical components can exist between elements that are "optically coupled." Similarly, in this description, when the term "coupled" describes relationships between elements, it is not limited to "connected" or "directly connected," but may also include connections made with intervening elements, and additional elements and various connections may exist between any elements that are "coupled."

Light sources 102A-102B include any optical device(s) configured to emit light beam(s). Light sources 102A-102B may include, for example, one or more light-emitting diodes (LEDs), lasers, or arc lamps. In some systems, light sources 102A or 102B may emit white light beams, which may be selectively filtered by other components (not explicitly shown) of NED system 100. Alternatively, light sources 102A or 102B may emit colored light beams. For example, light sources 102A and 102B may each include multiple devices (e.g., lasers or LEDs), each capable of emitting colored light beams. Light path (a) represents an example path of a light beam emitted by light source 102A. Light path (a') represents an example path of a light beam emitted by light source 102B.

Lens systems 104 and 106 each refer to any suitable optical device(s) capable of receiving and transmitting incident light beams in in a manner that concentrates, diverges, refracts, diffracts, redirects, reshapes, integrates or reflects the incident light beams. In this example, lens system 104 includes at least two lenses 104A and 104B optically coupled to light source 102A, in which lens 104A receives a light beam emitted from light source 102A, concentrates the received light beam, and directs the concentrated light beam to lens 104B. Lens 104B receives the concentrated light beam from lens 104A, further concentrates the light beam, and directs the further concentrated light beam to TIR prism 104E. Lens system 104 further includes at least two additional lenses 104C and 104D optically coupled to light source 102B, in which lens 104C receives a light beam emitted from light source 102B transmitted along or parallel to light path (a'), concentrates the received light beam, and directs the concentrated light beam to lens 104D. Lens 104D receives the concentrated light beam from lens 104C, further concentrates the light beam, and directs the further concentrated light beam along or parallel to light path (a') toward TIR prism 104E. TIR prism 104F may operate to combine respective light beams transmitted by lenses 104B and 104D and direct the combined light beams along or parallel to light paths (a) and (a') toward spatial light modulator 120.

An optional optical component 104F may be positioned within the light path (a) between TIR prims 140F and lens system 106. In some systems, optical component 140F may include a fly's-eye array or microlens array configured to receive incident light beams received along or parallel to light path (a) and to produce homogenized light beams along light path (a). In some systems, optical component 104F may include a polarizing beam splitter.

Figure 2A:
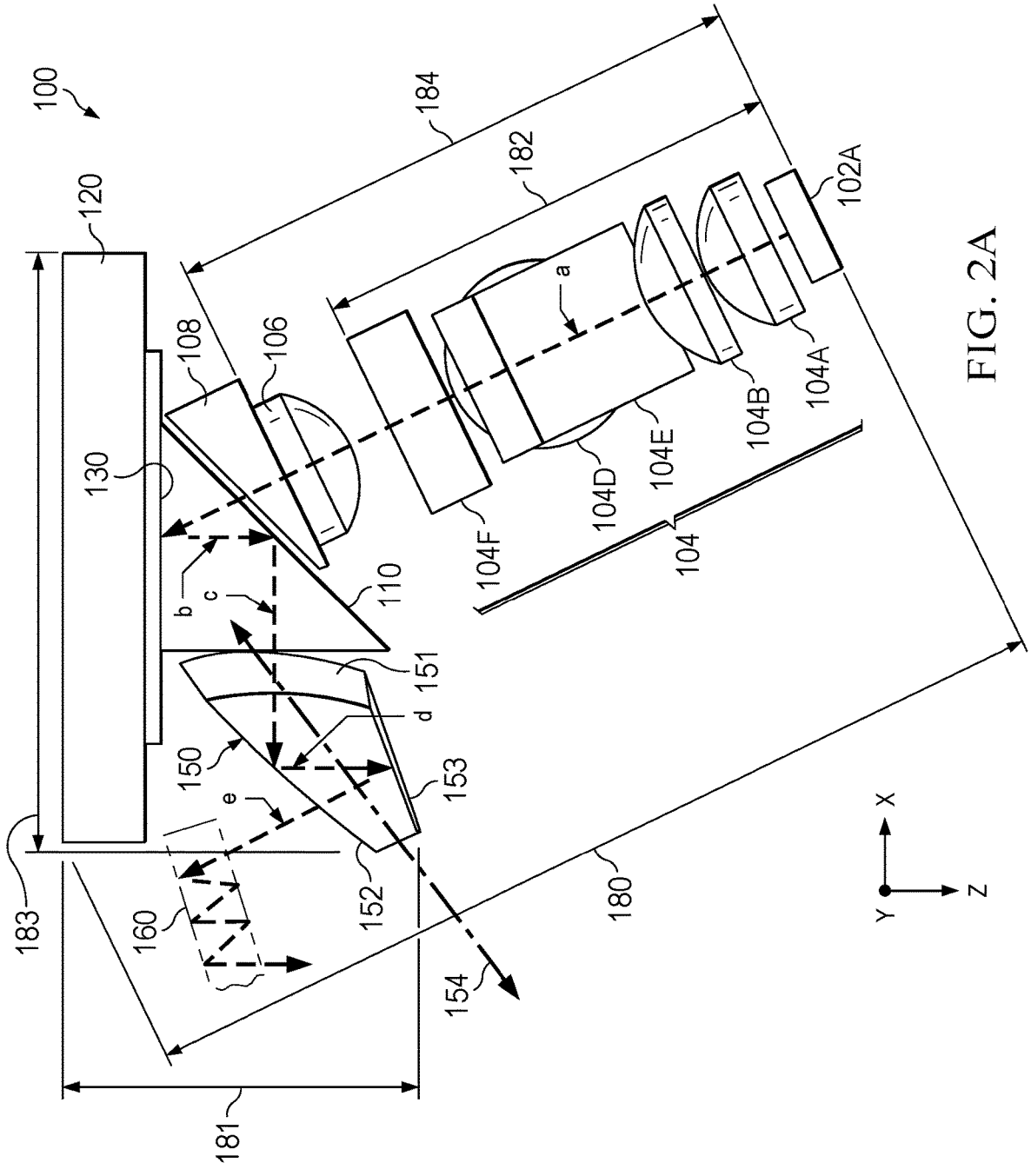
FIGS. 2A-2E are perspective views of a portion of the NED system of FIGS. 1A-1C.
Figure 2B:
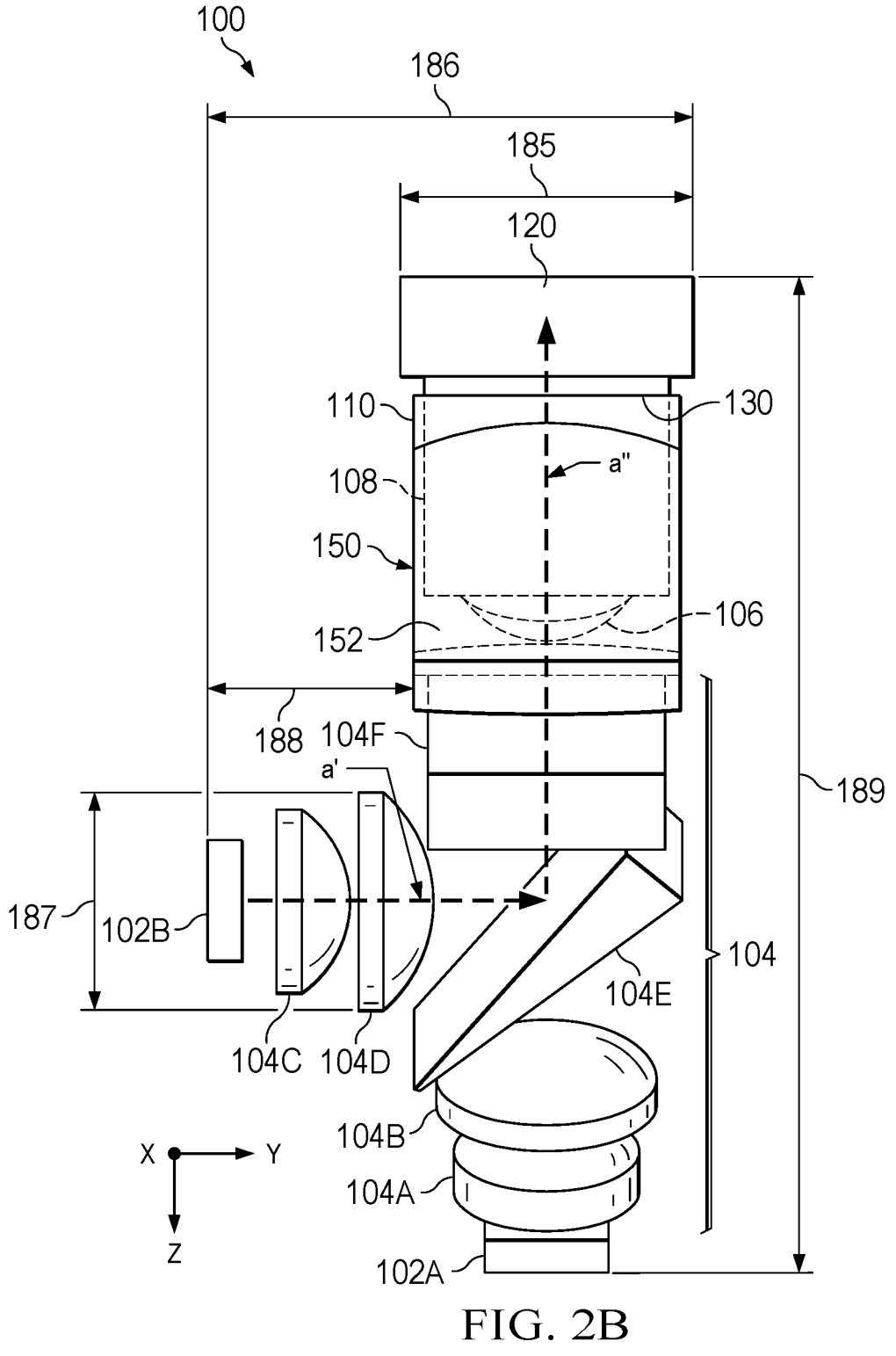
Figure 2C:
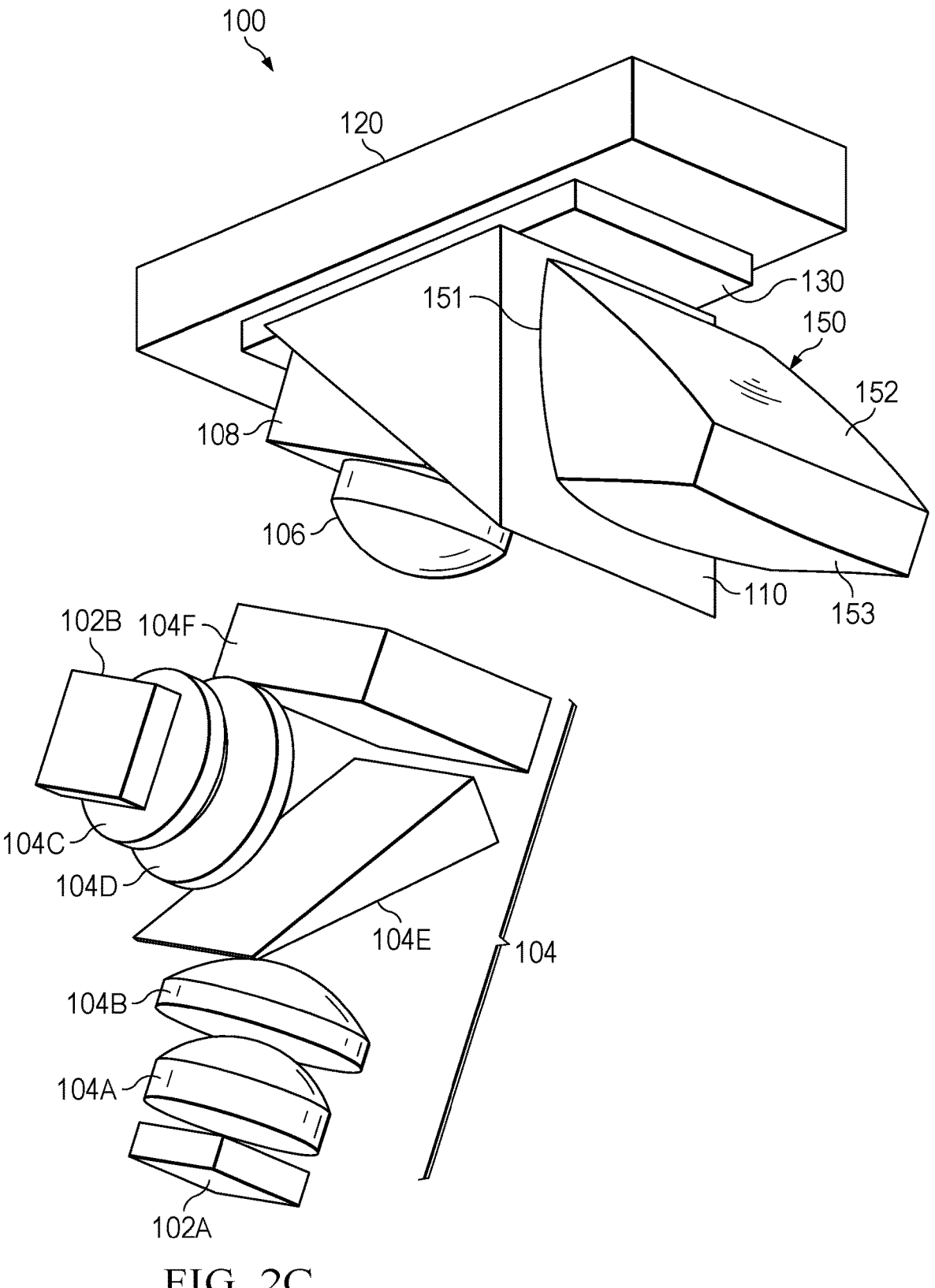
Figure 2D:
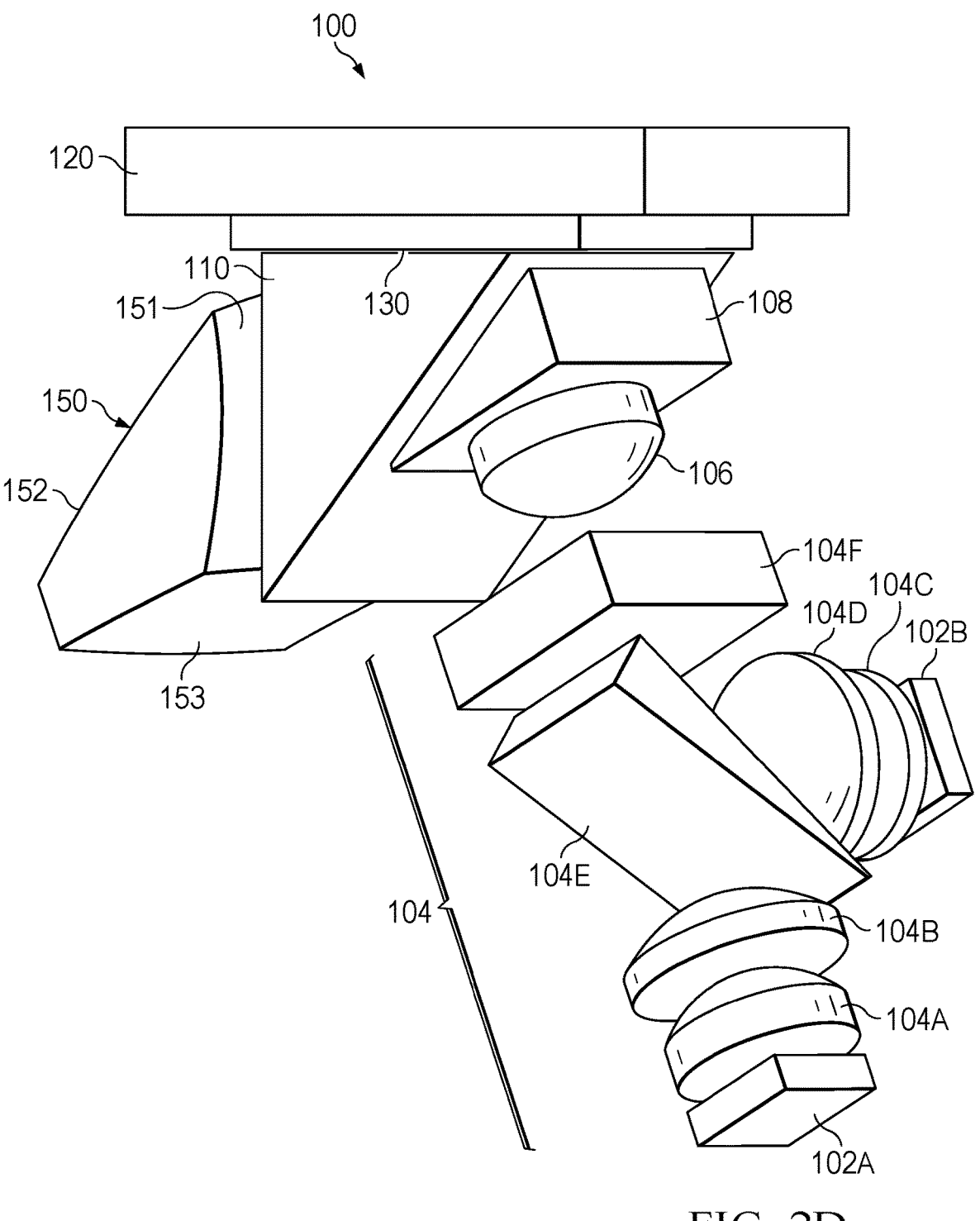
Figure 2E:
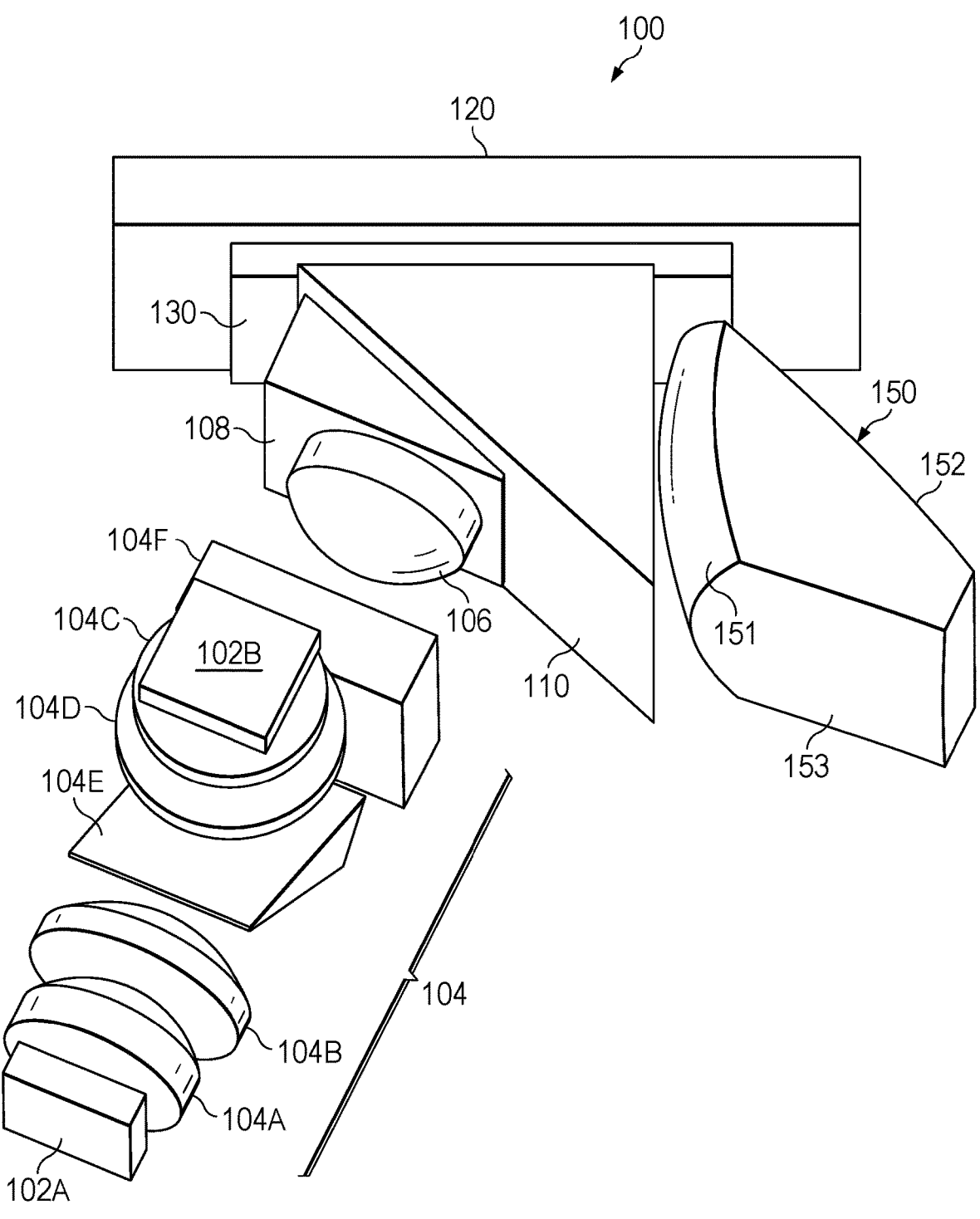

In this example, lens system 106 includes at least one plano-convex lens collectively configured to focus incident light beams at a distance coincident with a surface of SLM 120. The light beams transmitted by lens system 106 may be directed through TIR prism 108 toward SLM 120 along or parallel to the combined light paths (a) and (a"). As shown in FIGS. 2A and 2B, lens systems 104 and 106 may include respective lens(es) that are rotationally symmetric along a central axis (e.g., an axis aligning with light path (a)). In some alternative systems, however, lens systems 104 or 106 may include one or more optical components that are rotationally asymmetric along a central axis.

Thus, in the illustrated example, multiple optical components (e.g., lens systems 104-106 and TIR prisms 108-110) are optically coupled between light source 102A and SLM 120 along light path (a). The same optical components (e.g., lens systems 104-106 and TIR prisms 106-108) are likewise optically coupled between light source 102B and SLM 120 along light paths (a') and (a").

TIR prisms 108 and 110 are optically coupled between lens system 106 and SLM 120 along light path (a). Each TIR prism 108-110 provides total internal reflection when the angle of incidence of a light beam is greater than the critical angle. For example, a light beam directed along light path (b) is internally reflected off a surface of TIR prism 110 and redirected along light path (c). However, another surface of TIR prism 110 transmits light beams directed along light path (a) toward SLM 120. Light beams transmitted along light path (c) are at an angle relative to another surface of TIR prism 110 that causes them to be transmitted toward freeform eyepiece 150. In some examples, a fold mirror may be used in place of, or in addition to, either TIR prism 108 or TIR prism 110.

SLM 120 refers to any suitable optical device that imposes some form of spatially varying modulation on a beam of light. Various optical devices can implement spatial light modulation, such as one or more digital micromirror devices (DMD), liquid crystal displays (LCD), liquid crystal on silicon (LCoS), and so forth. In some systems in which SLM 120 includes an LCoS device, a polarizing beam splitter may be optically coupled to SLM 120 in a manner that enables the polarizing beam splitter to provide polarized light beams to SLM 120. For example, optical component 104F may be configured as or may include a polarizing beam splitter.

In some systems, the light illuminating SLM 120 is tinged with a color, for example by using either a white light source and some type of color filter or by using one or more light sources that each provide a respective colored light beam. This enables some display systems using spatial light modulation to display colored images. In the absence of chromatic correction, different colored light beams (e.g., red, green and blue) having different wavelengths may focus at different respective locations of an image plane surface of the SLM 120. NED system 100 may be configured to correct such chromatic aberrations mechanically (e.g., through the use of one or lens) or electronically (e.g., through processing software).

SLM 120 is optically coupled to light source(s) 102A-102B. In this example, SLM 120 is illustrated as receiving light beams along light paths (a) and (a") and producing spatially-modulated light beams along light path (b). In some systems, SLM 120 may selectively reflect incident light beams (a and a") according to a spatially modulated pattern to produce spatially-modulated light beams (b). A DMD is an example device capable of such reflective spatial modulation. A DMD is an optical micro-electrical-mechanical system (MEMS) that contains an array of highly reflective micromirrors, each corresponding to at least one display pixel. Each micromirror may be individually addressed in either an "on" or "off" state, where an "on" state of a given micromirror causes light beams spatially corresponding to that micromirror to be projected onto a pupil of a user wearing NED system 100. Gray scale may be created by causing the micromirrors to oscillate some preset number of times within a timeframe corresponding to the display of a single image. A full color gamut may be created by time multiplexing the individual display of three or more primary colors (e.g., red, green, and blue).

In other systems, SLM 120 may produce modulated light beams using one or more devices different from the general DMD description above. For example, SLM 120 may produce modulated light beams by selective redirection using reflective LCoS technology. In addition, SLM 120 may selectively transmit incident light beams using an LCD crystal panel or an interferometric modulator. The position of light source(s) 102A and 102B relative to SLM 120 may be altered, in some systems, to accommodate an alternative SLM 120 that modulates light beams differently from what is representatively shown in FIGS. 2A-2B.

In some systems, SLM 120 includes a cover glass (not shown) physically attached thereto and positioned within the light path between SLM 120 and TIR prism 110. Use of such a cover glass is optional. For systems in which SLM 120 has a cover glass attached thereto, the cover glass may be configured to provide protection for the underlying spatial light modulator(s). In addition, such a cover glass may be configured to passively transmit incident light beams with little to no redirection.

TIR prism 110 receives light beams transmitted along light path (b). As shown in FIG. 2A, TIR prism 110 has a face at which light at some angles undergoes total internal reflection, as represented by the reflection of light path (b) to the direction shown by light path (c). Light beams traveling along light path (c) are at an angle that enables them to pass through another face of TIR prism 110 toward freeform eyepiece 150.

Freeform eyepiece 150 has a solid, one-piece, freeform shape that is rotationally asymmetric. Freeform eyepiece 150 has certain properties described herein that may allow for size, weight, and cost reductions relative to other designs, such as, for example, those which require multiple, bulky, rotationally-symmetric optical components.

The controlled manipulation of light beams by freeform eyepiece 150 may be described in further detail with reference to representative light paths (c)-(e) shown in FIG. 2A. As explained previously, TIR prism 110 directs light beams along, or approximately parallel to, light path (c) toward a first surface 151 of freeform eyepiece 150. The first surface 151 has an extended polynomial shape that is configured to receive and transmit light beams along light path (c). Freeform eyepiece 150 also has a second surface 152 having an extended polynomial shape configured to receive light beams transmitted along light path (c). Because the incident angle of light path (c) relative to surface 152 is greater than the critical angle of surface 152, surface 152 internally reflects the received light beams along, or approximately parallel to, light path (d). Freeform eyepiece 150 also has a third surface 153 having a biconic zernike shape and configured to receive light beams transmitted along, or approximately parallel to, light path (d) and reflect the received light beams along, or approximately parallel to, light path (e). Because the incident angle of light path (e) relative to surface 152 is less than the critical angle of surface 152, the light beams transmitted along (or parallel to) light path (e) are transmitted through surface 152. Surface 152 may further operate to concentrate the light beams transmitted therethrough (e.g., as representatively shown in FIGS. 3A, 4A, 5A and 6A). Thus, light beams transmitted into freeform eyepiece 150 are internally reflected multiple times (twice in this example) within freeform eyepiece 150 before exiting freeform eyepiece 150 at an angle different from the incident angle and with a more concentrated focus.

In some systems, NED system 100 may achieve at least a 35% size reduction relative to designs reliant on rotationally-symmetric optical components. Such size reduction may be achieved while also satisfying certain design constraints that may be required for certain AR or VR applications or products. As explained with reference to FIGS. 1A-1C, for example, from an optics perspective, NED system 100 may be configured to provide display information capable of achieving certain resolution targets and a desired angular FOV (e.g., from 30 to 50 degrees) from the perspective of a human pupil. As another example, NED system 100 may be configured to achieve certain volume, weight, and form factors for NED system 100 overall. This may enable certain user scenarios for NED system 100, such as, for example, improved user comfort in continually wearing a headset or eyeglass(es) containing NED system 100 for prolonged periods of time.

Freeform eyepiece 150 has a one-piece, freeform shape that is rotationally asymmetric and that enables certain light manipulation described herein. One defining aspect of rotational asymmetry, as that term is used herein, is that there is no single axis upon which freeform eyepiece 150 can rotate that would cause each point along the outer surfaces (e.g., surfaces 151-153) of freeform eyepiece 150 to maintain the same distance from that rotational axis. Another defining aspect of rotational asymmetry, as that term is used herein, may be explained with reference to the central axis 154 of freeform eyepiece 150. The central axis 154 of freeform eyepiece 150 is defined herein as the optical axis which (1) extends through the most central point of the surface 151 of freeform eyepiece 150 through which incident light beams (c) enter freeform eyepiece 150 and (2) is the axis most equidistant between opposite surfaces (e.g., opposite surfaces 152 and 153) of freeform eyepiece 150, as determined by the points at which a line normal to the axis intersect the opposite surfaces.

As shown in FIG. 2A, freeform eyepiece 150 is rotationally asymmetric relative to its central axis 154 at least in that opposite surfaces 152 and 153 are not equally distant from any given point along the central axis 154. A freeform shape for freeform eyepiece 150, as described herein, may be contrasted with, for example, a rotationally symmetric, disc-shaped lens in which opposite sides of a rounded outer edge of the lens is equidistant from the central optical axis of the lens.

Freeform eyepiece 150 may be configured such that surface 152 has a maximum end-to-end length greater than the maximum end-to-end length of surface 153. In addition, freeform eyepiece 150 may be configured such that surface 153 has a greater end-to-end maximum length than that of surface 151. As shown in FIG. 2A, freeform eyepiece and SLM 120 may be optically coupled (via TIR prism 110), such that a minimum distance between surface 152 and SLM 120 may be less than a minimum distance between surface 153 and SLM 120. However, other configurations may be used, such as, for example, the alternative configuration described with reference to FIGS. 6A and 6B.

Freeform eyepiece 150 may include any suitable optically transparent material. In some systems, freeform eyepiece 150 may include plastic, such as, for example, one or more cyclo olefin polymers (COP) (e.g., Zeonex® E48R or Zeonor® supplied by Zeon Corp.) polymethyl methacrylate (PMMA) (e.g., Acrylic supplied by Arkema), polystyrene (e.g., Styrene supplied by Americas Styrenics LLC), polycarbonate (e.g., Lexan® supplied by SABIC Inc. or Makrolon® supplied by Covestro AG); or polyester (e.g., OKP1 or OKP4 supplied by Osaka Gas Chemicals Co. Ltd.). In some systems, freeform eyepiece 150 may include glass.

Freeform eyepiece 150 can be fabricated using any suitable process capable of producing an appropriate one-piece, freeform shape. For example, freeform eyepiece 150 may be fabricated using injection molding, grinding and polishing, raster milling, or diamond machining using multiple different axis of control to fine tune every point, cut and polish. The appropriate fabrication method(s) may be selected according to certain comprehensive factors, such as, for example, design tolerance and the number of units to be produced over time.

Freeform eyepiece 150 can have any suitable physical dimensions that accommodate the light manipulation described herein. As explained further with reference to FIGS. 3A-6B, for example, freeform eyepiece 150 may have a height within the range of 6.8 mm to 9.3 mm, a length within the range of 6.4 mm to 9.3 mm, and a width within the range of 6.0 mm to 8.4 mm.

A waveguide 160 may be optically coupled to the freeform eyepiece 150 and configured to receive light beams transmitted by the freeform eyepiece and to transmit received light beams to a reflective surface of a wearable eye lens.

FIGS. 2A and 2B further illustrate example measurements between or for certain optical components of NED system 100. As shown in FIG. 2A, for example, a distance (180) between respective surfaces of SLM 120 and light source 102A may be approximately 25.1 mm. In addition, FIG. 2A shows various distances (181, 182) of approximately 9 mmm and 16 mm, respectively, between respective features of SLM 120 and freeform eyepiece 150. FIG. 2A further shows a 16 mm distance (183) between respective surfaces of TIR prism 108 and light source 120A.

As shown in FIG. 2B, for example, SLM 120 may have an edge-to-edge width (185) of approximately 5.9 mm and a distance (186) between respective surfaces of SLM 120 and light source 102B may be approximately 10.1 mm. FIG. 2B further shows example height and width dimensions (187, 188) of approximately 4.6 mm and 4.1 mm, respectively, for the portion of lens system 104 receiving a light beam from light source 102B along light path (a'). In addition, FIG. 2B shows 20.8 mm as the approximate distance (189) between respective surfaces of light source 102A and SLM 120. Although FIGS. 2A and 2B illustrate example measurements between or for certain optical components of NED system 100, NED system 100 may be configured with any suitable dimensions.

Figure 3A:
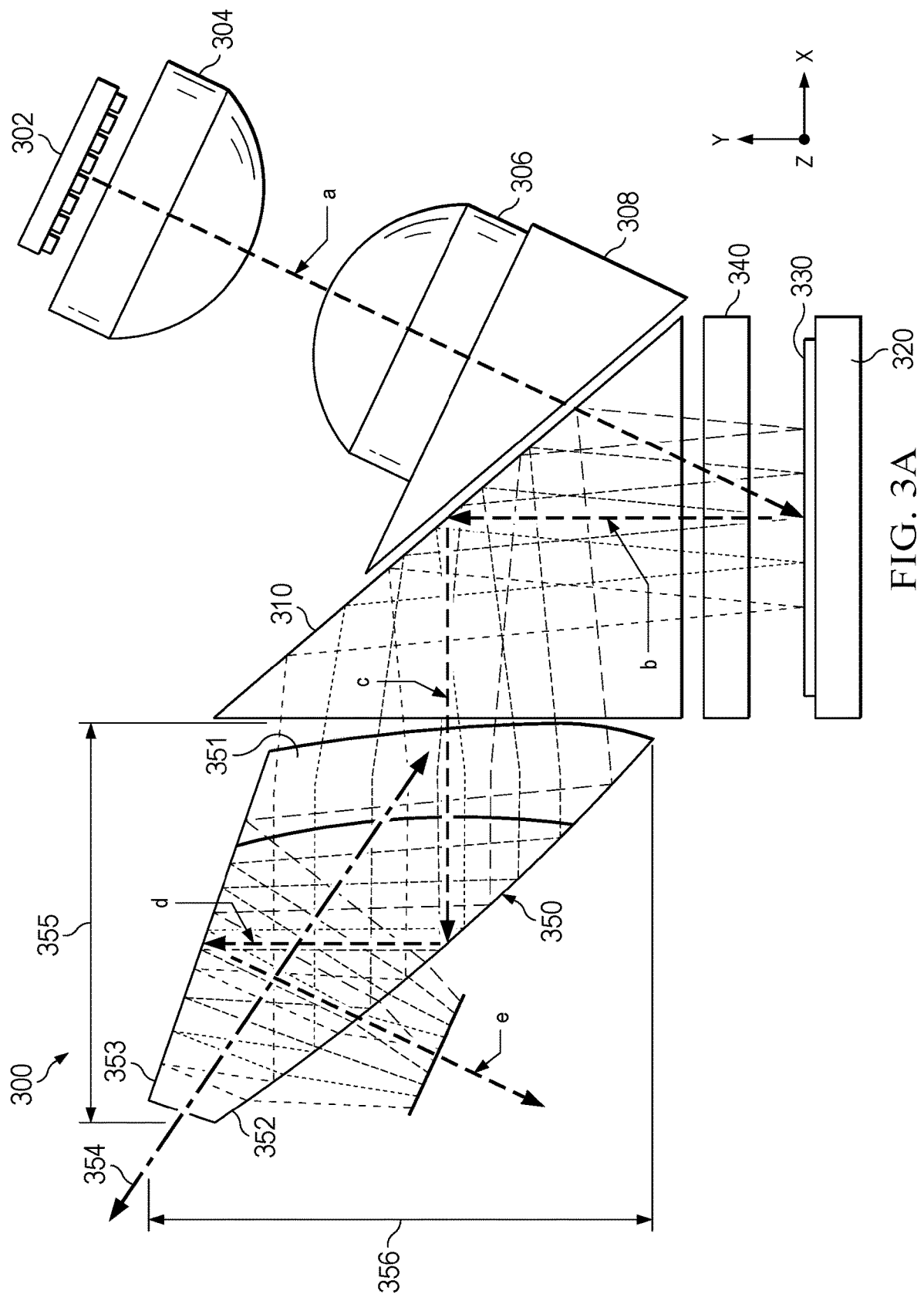
FIGS. 3A-3B are different perspective views of a simplified block diagram of example optical components that may be used by the NED system of FIGS. 1A-1C.
Figure 3B:
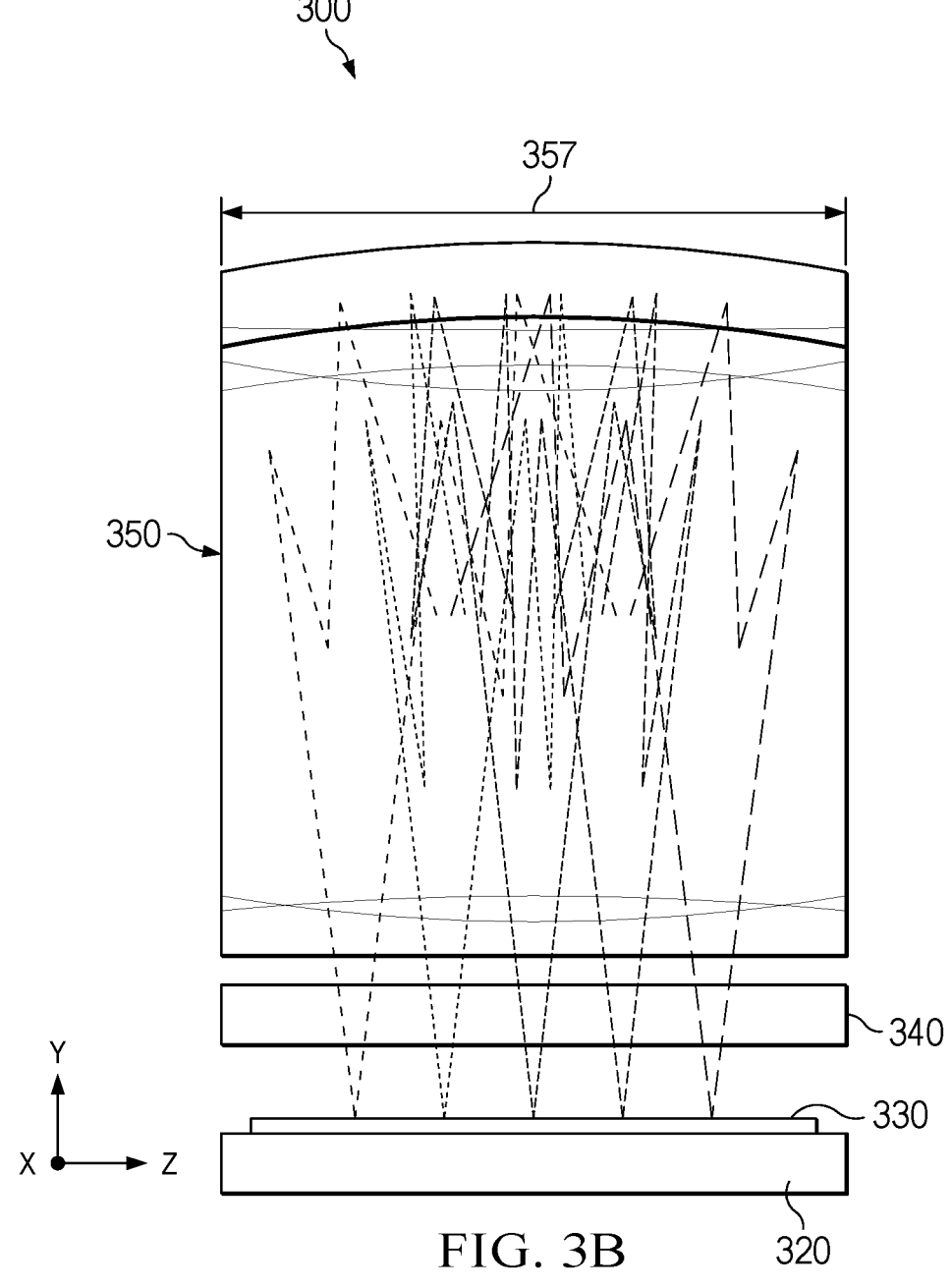

FIGS. 3A-3B are different perspective views of a simplified block diagram 300 of example optical components that may be used by the NED system 100 of FIGS. 1A-1C. The block diagram 300 of FIG. 3B is rotated clockwise ninety degrees on the x-z plane relative to the block diagram 300 of FIG. 3A. FIGS. 3A-3B further illustrate additional representative light beams that may be directed by various optical components of NED system 100. In this example, block diagram 300 includes one or more of each of the following optical components: light source 302, lens system 304, lens system 306, TIR prism 308, TIR prism 310, SLM 320, extended pixel resolution (XPR) component 340, and freeform eyepiece 350.

Optical components 302-350 may be substantially similar in structure or function to corresponding optical components 102-150 described herein with reference to FIGS. 2A-2B. In addition, optical components 302-350 may be optically coupled in a manner substantially similar to the optical coupling of optical components 102-150 described herein with reference to FIGS. 2A-2B.

Light source 302 includes any optical device(s) configured to emit light beam(s). Light source 302 may include, for example, one or more LEDs, lasers, or arc lamps. In some systems, light source 302 may emit white light beams, which may be selectively filtered by other components (not explicitly shown). Alternatively, light source 302 may emit colored light beams. For example, light source 302 may include multiple devices (e.g., lasers or LEDs), each capable of emitting colored light beams. Light path (a) represents an example path of a light beam emitted by light source 302.

Lens systems 304 and 306 each refer to any suitable optical device(s) capable of receiving and transmitting incident light beams in in a manner that concentrates, diverges, refracts, diffracts, redirects, reshapes, integrates or reflects the incident light beams. As shown in FIG. 3A, lens systems 304 and 306 may include respective lens(es) that are rotationally symmetric along a central axis (e.g., an axis aligning with light path (a)). In some alternative systems, however, lens systems 304 or 306 may include one or more optical components that are rotationally asymmetric along a central axis.

In some systems, lens system 304 may include one or more lenses optically coupled to light source 302 and configured to concentrate light beams emitted by light source 302. Lens system 306 may include at least one plano-convex lens collectively configured to focus incident light beams at a distance coincident with a surface of SLM 320. The light beams transmitted by lens system 306 may be directed through TIR prism 308 toward SLM 320 along or parallel to light path (a).

TIR prisms 308 and 310 are optically coupled between lens system 306 and SLM 320 along light path (a). Each TIR prism 308-310 provides total internal reflection when the angle of incidence of a light beam is greater than the critical angle. For example, a light beam directed along light path (b) is internally reflected off a surface of TIR prism 310 and redirected along light path (c). However, another surface of TIR prism 310 transmits light beams directed along light path (a) toward SLM 320. Light beams transmitted along light path (c) are at an angle relative to another surface of TIR prism 310 that causes them to be transmitted toward freeform eyepiece 350. In some examples, a fold mirror may be used in place of, or in addition to, either TIR prism 308 or TIR prism 310. In some systems, axial color can be corrected by changing the material of TIR prism 310 (e.g., to create abbe number difference between the freeform eyepiece 350 and TIR prism 310). The correction of axial color may improve the image performance for some systems.

As shown in FIG. 3A, XPR component 340 is positioned within light path (b) between SLM 320 and TIR prism 310. XPR component 340 is capable of displacing each projected image by a fraction of a display pixel (e.g., one-half or one-third). This allows the creation of multiple subframes for each image frame. When projected in rapid succession, the subframes superimpose and create to the human eye a complete and seamless image. The subframes may be aligned, for example, so that the corners of the pixels in a second subframe are projected at the centers of the first, thereby achieving the illusion of increased resolution. For example, XPR component 340 may be capable of emulating a 1920×1080 resolution using a spatial light modulator having a physical pixel resolution of 1280×1024. Thus, XPR component 340 may enable a lower-resolution, fixed pixel device to produce images that emulate the picture of a higher-resolution, fixed-pixel device, at a reduced cost. However, alternative systems may not include an XPR component positioned within light path (b) between SLM 320 and TIR prism 310.

FIGS. 3A-3B further illustrate certain example edge-to-edge dimensions of freeform eyepiece 350. From the perspective of FIG. 3A, freeform eyepiece 350 has a maximum height (indicated by dimension 356 along the y-axis) of approximately 7.752 mm and a length (indicated by dimension 355 along the x-axis) of 8.913 mm. From the rotated perspective of FIG. 3B, freeform eyepiece 350 has a horizontal width (indicated by dimension 357 along the z-axis) of approximately 8.415 mm.

The arrangement of optical components shown in FIGS. 3A-3B may enable a near eye display having, for example, a diagonal field of view of at least 50 degrees at a 4×3 aspect ratio, an aperture at f/2.9 that is telecentric at an image plane (e.g., at a surface of SLM 320), a pupil size (as transmitted by freeform eyepiece 350) of at least 3 mm, a negative distortion within the range of −8.8% to zero, and a modulation transfer function (MTF) of at least 5% at 93 line pairs per millimeter (lp/mm) for the full field of view.

The controlled manipulation of light beams by freeform eyepiece 350 may be described in further detail with reference to representative light paths (c)-(e) shown in FIG. 3A. As explained previously, TIR prism 310 directs light beams along, or approximately parallel to, light path (c) toward a first surface 351 of freeform eyepiece 350. The first surface 351 has an extended polynomial shape that is configured to receive and transmit light beams along light path (c). Freeform eyepiece 350 also has a second surface 352 having an extended polynomial shape configured to receive light beams transmitted along light path (c). Because the incident angle of light path (c) relative to surface 352 is greater than the critical angle of surface 352, surface 352 internally reflects the received light beams along, or approximately parallel to, light path (d). Freeform eyepiece 350 also has a third surface 353 having a biconic zernike shape and configured to receive light beams transmitted along, or approximately parallel to, light path (d) and reflect the received light beams along, or approximately parallel to, light path (e). Because the incident angle of light path (e) relative to surface 352 is less than the critical angle of surface 352, the light beams transmitted along (or parallel to) light path (e) are transmitted through surface 352. As shown in FIG. 3A, surface 352 may further operate to concentrate the light beams transmitted therethrough. Thus, light beams transmitted into freeform eyepiece 350 are internally reflected multiple times (twice in this example) within freeform eyepiece 350 before exiting freeform eyepiece 350 at an angle different from the incident angle and with a more concentrated focus.

Figure 4A:
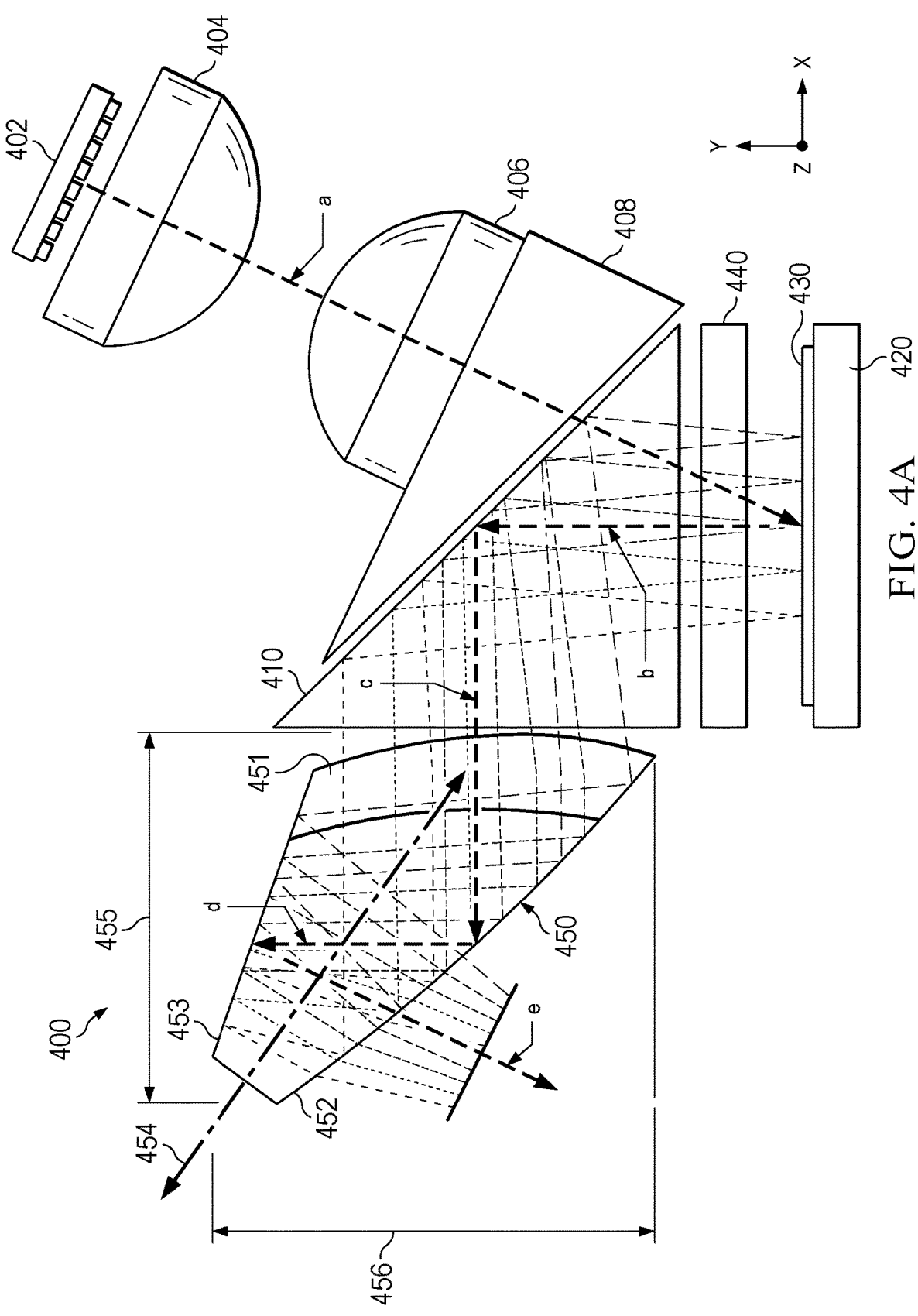
FIGS. 4A-4B are different perspective views of a simplified block diagram of example optical components that may be used by the NED system of FIGS. 1A-1C.
Figure 4B:
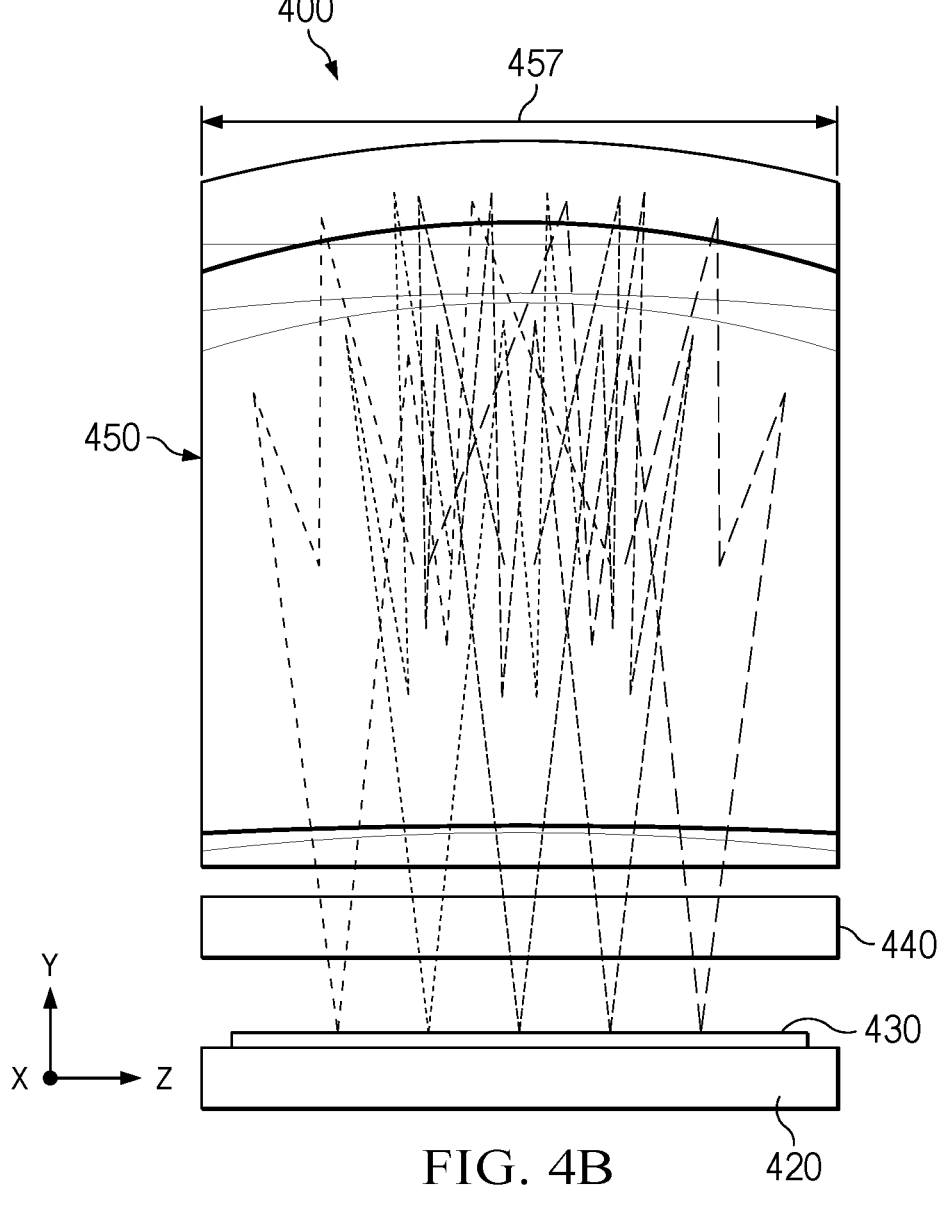

FIGS. 4A-4B are different perspective views of a simplified block diagram 400 of example optical components that may be used by the NED system 100 of FIGS. 1A-1C. The block diagram 400 of FIG. 4B is rotated clockwise ninety degrees on the x-z plane relative to the block diagram 400 of FIG. 4A. FIGS. 4A-4B further illustrate additional representative light beams that may be directed by various optical components of NED system 100. In this example, block diagram 400 includes one or more of each of the following optical components: light source 402, lens system 404, lens system 406, TIR prism 408, TIR prism 410, SLM 420, XPR component 440, and freeform eyepiece 450.

Optical components 402-450 may be substantially similar in structure or function to corresponding optical components 102-150 described herein with reference to FIGS. 2A-2B. In addition, optical components 402-450 may be optically coupled in a manner substantially similar to the optical coupling of optical components 102-150 described herein with reference to FIGS. 2A-2B. XPR component 440 may be substantially similar in structure or function, and may be optically coupled, in a manner substantially similar to XPR component 340 described with reference to FIG. 3A.

Light source 402 includes any optical device(s) configured to emit light beam(s). Light source 402 may include, for example, one or more LEDs, lasers, or arc lamps. In some systems, light source 402 may emit white light beams, which may be selectively filtered by other components (not explicitly shown). Alternatively, light source 402 may emit colored light beams. For example, light source 402 may include multiple devices (e.g., lasers or LEDs), each capable of emitting colored light beams. Light path (a) represents an example path of a light beam emitted by light source 402.

Lens systems 404 and 406 each refer to any suitable optical device(s) capable of receiving and transmitting incident light beams in in a manner that concentrates, diverges, refracts, diffracts, redirects, reshapes, integrates or reflects the incident light beams. As shown in FIG. 4A, lens systems 404 and 406 may include respective lens(es) that are rotationally symmetric along a central axis (e.g., an axis aligning with light path (a)). In some alternative systems, however, lens systems 404 or 406 may include one or more optical components that are rotationally asymmetric along a central axis.

In some systems, lens system 404 may include one or more lenses optically coupled to light source 402 and configured to concentrate light beams emitted by light source 402. Lens system 406 may include at least one plano-convex lens collectively configured to focus incident light beams at a distance coincident with a surface of SLM

420. The light beams transmitted by lens system 406 may be directed through TIR prism 408 toward SLM 420 along or parallel to light path (a).

TIR prisms 408 and 410 are optically coupled between lens system 406 and SLM 420 along light path (a). Each TIR prism 408-410 provides total internal reflection when the angle of incidence of a light beam is greater than the critical angle. For example, a light beam directed along light path (b) is internally reflected off a surface of TIR prism 410 and redirected along light path (c). However, another surface of TIR prism 410 transmits light beams directed along light path (a) toward SLM 420. Light beams transmitted along light path (c) are at an angle relative to another surface of TIR prism 410 that causes them to be transmitted toward freeform eyepiece 450. In some examples, a fold mirror may be used in place of, or in addition to, either TIR prism 408 or TIR prism 410. In some systems, axial color can be corrected by changing the material of TIR prism 410 (e.g., to create abbe number difference between the freeform eyepiece 450 and TIR prism 410). The correction of axial color may improve the image performance for some systems.

FIGS. 4A-4B further illustrate certain example edge-to-edge dimensions of freeform eyepiece 450. From the perspective of FIG. 4A, freeform eyepiece 350 has a maximum height (indicated by dimension 456 along the y-axis) of approximately 7.909 mm and a length (indicated by dimension 455 along the x-axis) of approximately 9.324 mm. From the perspective of FIG. 4B, freeform eyepiece 450 has a horizontal width (indicated by dimension 457 along the z-axis) of approximately 8.388 mm.

The arrangement of optical components shown in FIGS. 4A-4B may enable a near eye display having, for example, a diagonal field of view of at least 50 degrees at a 4×3 aspect ratio, an aperture at f/2.9 that is telecentric at an image plane (e.g., at a surface of SLM 420), a pupil size (as transmitted by freeform eyepiece 450) of at least 3 mm, a negative distortion within the range of −8.2% to zero, and a MTF of at least 20% at 93 lp/mm for the full field of view.

The controlled manipulation of light beams by freeform eyepiece 450 may be described in further detail with reference to representative light paths (c)-(e) shown in FIG. 4A. As explained previously, TIR prism 410 directs light beams along, or approximately parallel to, light path (c) toward a first surface 451 of freeform eyepiece 450. The first surface 451 has an extended polynomial shape that is configured to receive and transmit light beams along light path (c). Freeform eyepiece 450 also has a second surface 452 having an extended polynomial shape configured to receive light beams transmitted along light path (c). Because the incident angle of light path (c) relative to surface 452 is greater than the critical angle of surface 452, surface 452 internally reflects the received light beams along, or approximately parallel to, light path (d). Freeform eyepiece 450 also has a third surface 453 having a biconic zernike shape and configured to receive light beams transmitted along, or approximately parallel to, light path (d) and reflect the received light beams along, or approximately parallel to, light path (e). Because the incident angle of light path (e) relative to surface 452 is less than the critical angle of surface 452, the light beams transmitted along (or parallel to) light path (e) are transmitted through surface 452. As shown in FIG. 4A, surface 452 may further operate to concentrate the light beams transmitted therethrough. Thus, light beams transmitted into freeform eyepiece 450 are internally reflected multiple times (twice in this example) within freeform eyepiece 450 before exiting freeform eyepiece 450 at an angle different from the incident angle and with a more concentrated focus.

Figure 5A:
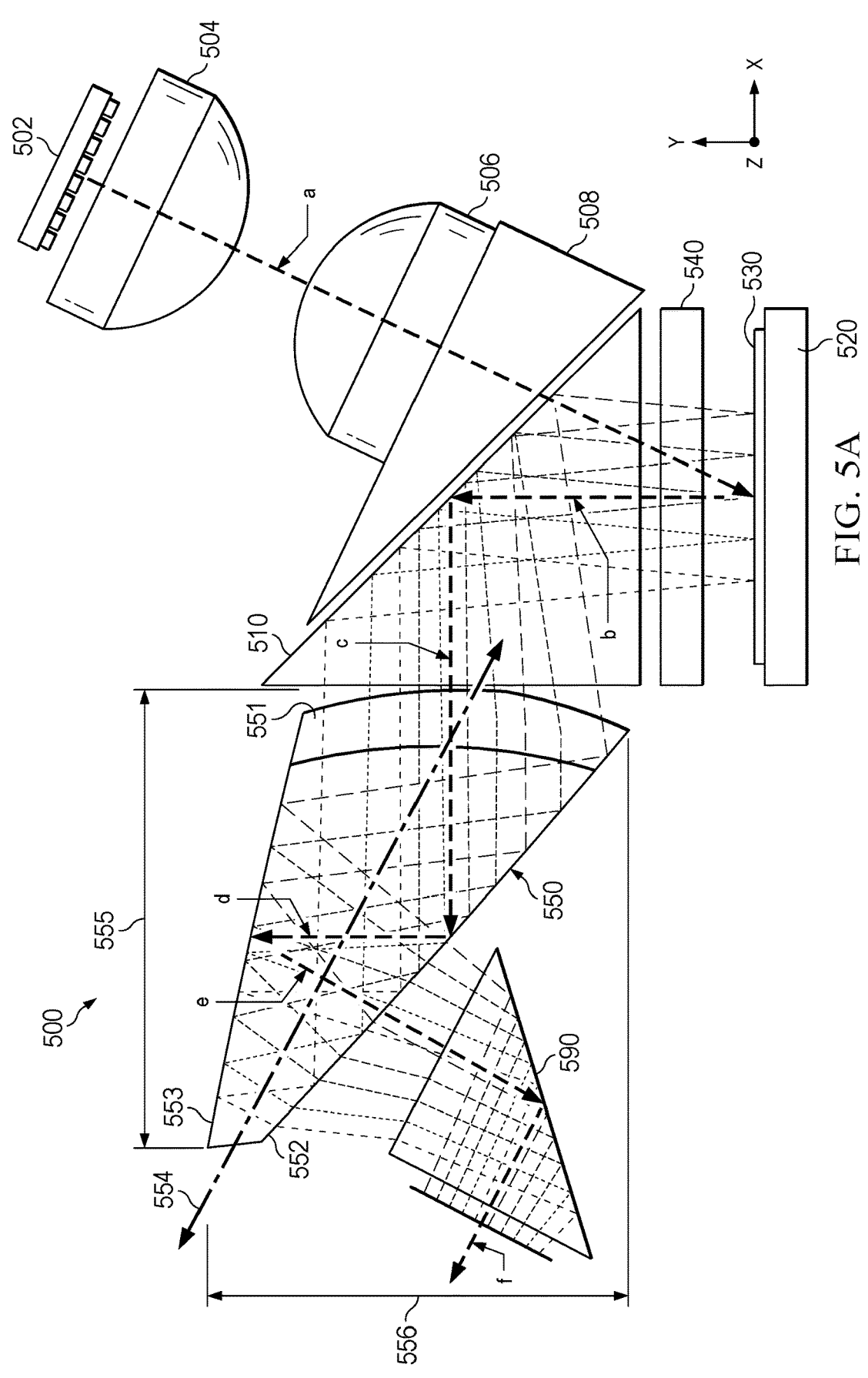
FIGS. 5A-5B are different perspective views of a simplified block diagram of example optical components that may be used by the NED system of FIGS. 1A-1C.
Figure 5B:
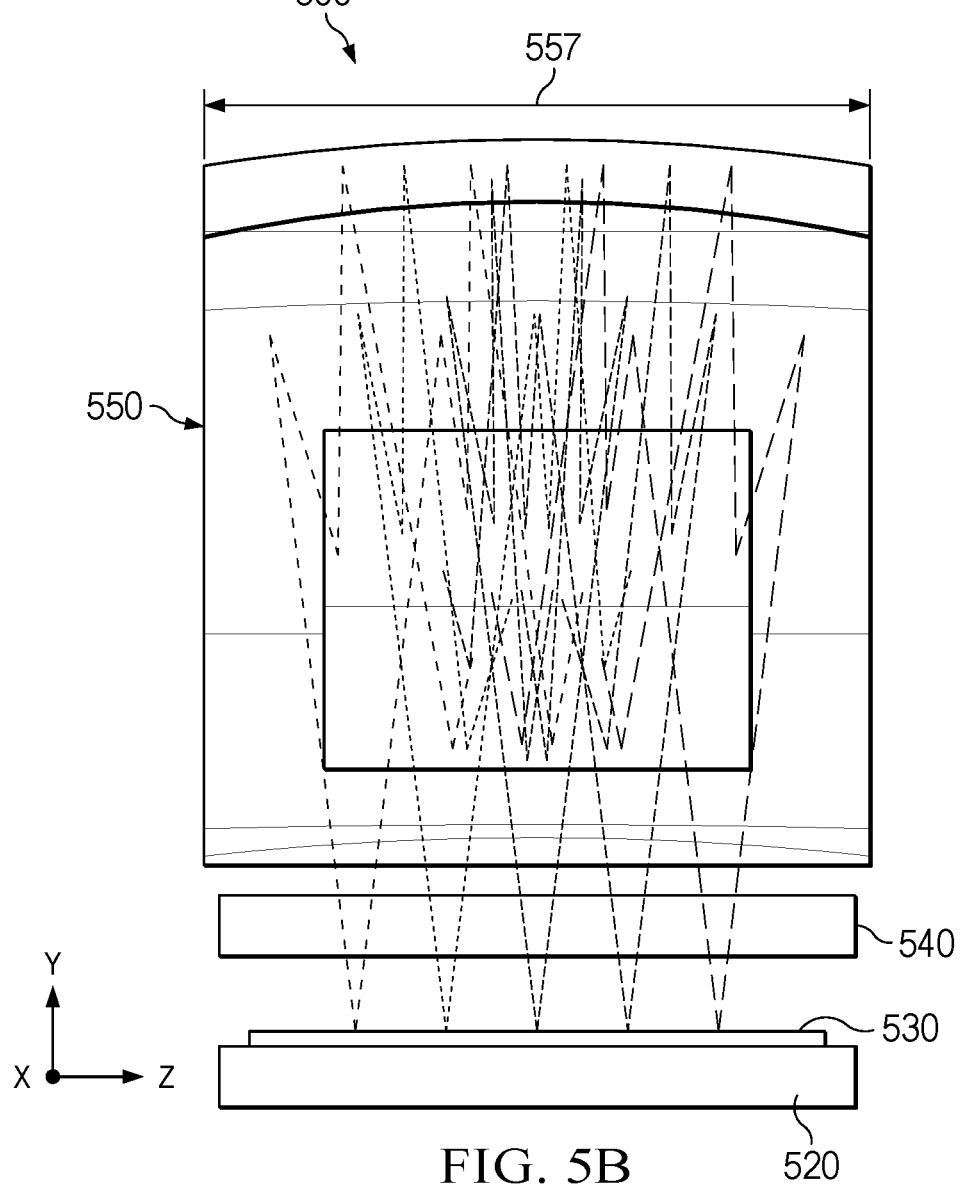

FIGS. 5A-5B are different perspective views of a simplified block diagram 500 of example optical components that may be used by the NED system 100 of FIGS. 1A-1C. The block diagram 500 of FIG. 5B is rotated clockwise ninety degrees on the x-z plane relative to the block diagram 500 of FIG. 5A. FIGS. 5A-5B further illustrate additional representative light beams that may be directed by various optical components of NED system 100. In this example, block diagram 500 includes one or more of each of the following optical components: light source 502, lens system 504, lens system 506, TIR prism 508, TIR prism 510, SLM 520, XPR component 540, and freeform eyepiece 550 and TIR prism 590.

Optical components 502-550 may be substantially similar in structure or function to corresponding optical components 102-150 described herein with reference to FIGS. 2A-2B. In addition, optical components 502-550 may be optically coupled in a manner substantially similar to the optical coupling of optical components 102-150 described herein with reference to FIGS. 2A-2B. XPR component 540 may be substantially similar in structure or function, and may be optically coupled, in a manner substantially similar to XPR component 340 described with reference to FIG. 3A. TIR prism 590 may be substantially similar in structure and function to TIR prisms 508 and 510.

Light source 502 includes any optical device(s) configured to emit light beam(s). Light source 502 may include, for example, one or more LEDs, lasers, or arc lamps. In some systems, light source 502 may emit white light beams, which may be selectively filtered by other components (not explicitly shown). Alternatively, light source 502 may emit colored light beams. For example, light source 502 may include multiple devices (e.g., lasers or LEDs), each capable of emitting colored light beams. Light path (a) represents an example path of a light beam emitted by light source 502.

Lens systems 504 and 506 each refer to any suitable optical device(s) capable of receiving and transmitting incident light beams in in a manner that concentrates, diverges, refracts, diffracts, redirects, reshapes, integrates or reflects the incident light beams. As shown in FIG. 5A, lens systems 504 and 506 may include respective lens(es) that are rotationally symmetric along a central axis (e.g., an axis aligning with light path (a)). In some alternative systems, however, lens systems 504 or 506 may include one or more optical components that are rotationally asymmetric along a central axis.

In some systems, lens system 504 may include one or more lenses optically coupled to light source 502 and configured to concentrate light beams emitted by light source 502. Lens system 506 may include at least one plano-convex lens collectively configured to focus incident light beams at a distance coincident with a surface of SLM 520. The light beams transmitted by lens system 506 may be directed through TIR prism 508 toward SLM 520 along or parallel to light path (a).

TIR prisms 508 and 510 are optically coupled between lens system 506 and SLM 520 along light path (a). Each TIR prism 508-510 provides total internal reflection when the angle of incidence of a light beam is greater than the critical angle. For example, a light beam directed along light path (b) is internally reflected off a surface of TIR prism 510 and redirected along light path (c). However, another surface of TIR prism 510 transmits light beams directed along light path (a) toward SLM 520. Light beams transmitted along light path (c) are at an angle relative to another surface of TIR prism 510 that causes them to be transmitted toward freeform eyepiece 550. In some examples, a fold mirror may be used in place of, or in addition to, either TIR prism 508 or TIR prism 510. In some systems, axial color can be corrected by changing the material of TIR prism 510 (e.g., to create abbe number difference between the freeform eyepiece 550 and TIR prism 510). The correction of axial color may improve the image performance for some systems.

As shown in FIG. 5A, TIR prism 590 may be optically coupled to freeform eyepiece 550 in a manner that enables TIR prism 590 to receive and redirect (through total internal reflection) incident light beams transmitted from freeform eyepiece 550. In some examples, TIR prism 590 can extend pupil distance by turning the pupil location through internal reflection.

FIGS. 5A-5B further illustrate certain example edge-to-edge dimensions of freeform eyepiece 550. From the perspective of FIG. 5A, freeform eyepiece 550 has a maximum height (indicated by dimension 556 along the y-axis) of approximately 7.254 mm and a length (indicated by dimension 555 along the x-axis) of approximately 6.84 mm. From the perspective of FIG. 5B, freeform eyepiece 550 has a horizontal width (indicated by dimension 557 along the z-axis) of approximately 6.485 mm.

The arrangement of optical components shown in FIGS. 5A-5B may enable a near eye display having, for example, a diagonal field of view of at least 40 degrees at a 4×3 aspect ratio, an aperture at f/3.2 that is telecentric at an image plane (e.g., at a surface of SLM 520), a pupil size (as transmitted by freeform eyepiece 550) of at least 2.5 mm, a negative distortion less than −2.0% to zero, and a MTF less than 20% at 93 lp/mm for the full field of view.

The controlled manipulation of light beams by freeform eyepiece 550 may be described in further detail with reference to representative light paths (c)-(e) shown in FIG. 5A. As explained previously, TIR prism 510 directs light beams along, or approximately parallel to, light path (c) toward a first surface 551 of freeform eyepiece 550. The first surface 551 has an extended polynomial shape that is configured to receive and transmit light beams along light path (c). Freeform eyepiece 550 also has a second surface 552 having an extended polynomial shape configured to receive light beams transmitted along light path (c). Because the incident angle of light path (c) relative to surface 552 is greater than the critical angle of surface 552, surface 552 internally reflects the received light beams along, or approximately parallel to, light path (d). Freeform eyepiece 550 also has a third surface 553 having a biconic zernike shape and configured to receive light beams transmitted along, or approximately parallel to, light path (d) and reflect the received light beams along, or approximately parallel to, light path (e). Because the incident angle of light path (e) relative to surface 552 is less than the critical angle of surface 552, the light beams transmitted along (or parallel to) light path (e) are transmitted through surface 552. As shown in FIG. 5A, surface 552 may further operate to concentrate the light beams transmitted therethrough. Thus, light beams transmitted into freeform eyepiece 550 are internally reflected multiple times (twice in this example) within freeform eyepiece 550 before exiting freeform eyepiece 550 at an angle different from the incident angle and with a more concentrated focus.

Figure 6A:
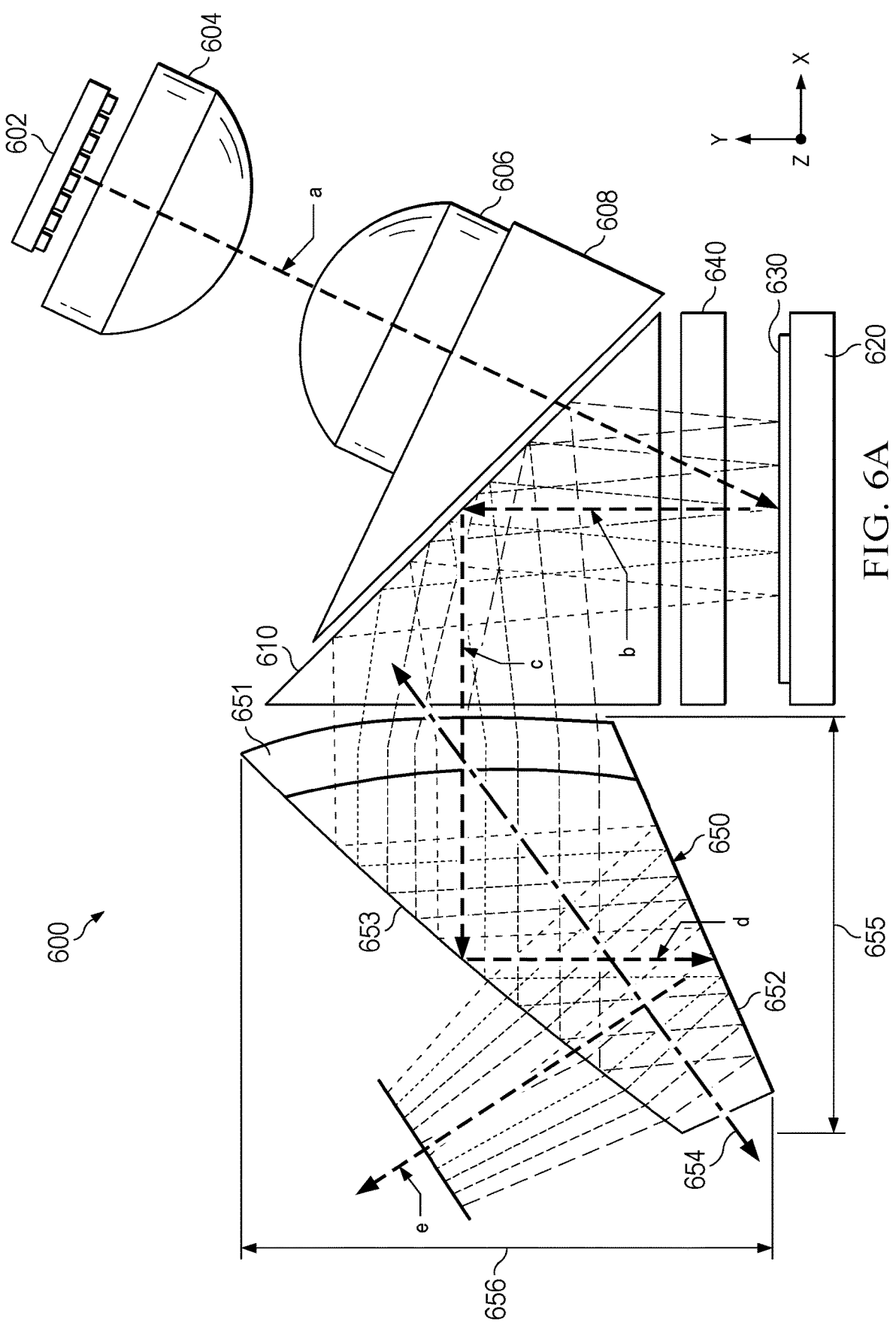
FIGS. 6A-6B are different perspective views of a simplified block diagram of example optical components that may be used by the NED system of FIGS. 1A-1C.
Figure 6B:
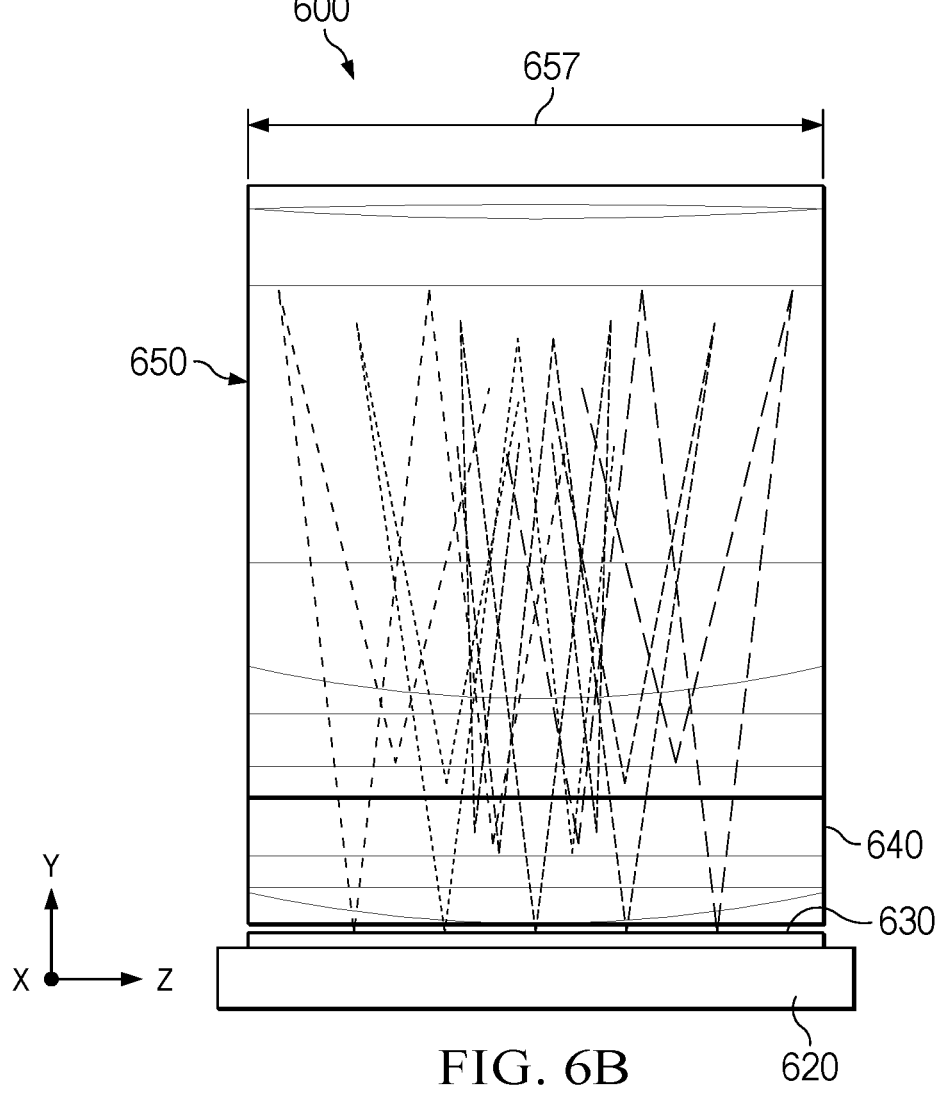

FIGS. 6A-6B are different perspective views of a simplified block diagram 6500 of example optical components that may be used by the NED system 100 of FIGS. 1A-1C. FIGS.

6A-6B further illustrate additional representative light beams that may be directed by various optical components of NED system 100. In this example, block diagram 600 includes one or more of each of the following optical components: TIR prism 610, SLM 620, XPR component 640, and freeform eyepiece 650.

Optical components 610-650 may be substantially similar in structure or function to corresponding optical components 102-150 described herein with reference to FIGS. 2A-2B. In addition, optical components 610-650 may be optically coupled in a manner substantially similar to the optical coupling of optical components 102-150 described herein with reference to FIGS. 2A-2B. XPR component 640 may be substantially similar in structure or function, and may be optically coupled, in a manner substantially similar to XPR component 340 described with reference to FIG. 3A.

Light source 602 includes any optical device(s) configured to emit light beam(s). Light source 602 may include, for example, one or more LEDs, lasers, or arc lamps. In some systems, light source 602 may emit white light beams, which may be selectively filtered by other components (not explicitly shown). Alternatively, light source 602 may emit colored light beams. For example, light source 602 may include multiple devices (e.g., lasers or LEDs), each capable of emitting colored light beams. Light path (a) represents an example path of a light beam emitted by light source 602.

Lens systems 604 and 606 each refer to any suitable optical device(s) capable of receiving and transmitting incident light beams in in a manner that concentrates, diverges, refracts, diffracts, redirects, reshapes, integrates or reflects the incident light beams. As shown in FIG. 6A, lens systems 604 and 606 may include respective lens(es) that are rotationally symmetric along a central axis (e.g., an axis aligning with light path (a)). In some alternative systems, however, lens systems 604 or 606 may include one or more optical components that are rotationally asymmetric along a central axis.

In some systems, lens system 604 may include one or more lenses optically coupled to light source 602 and configured to concentrate light beams emitted by light source 602. Lens system 606 may include at least one plano-convex lens collectively configured to focus incident light beams at a distance coincident with a surface of SLM 620. The light beams transmitted by lens system 606 may be directed through TIR prism 608 toward SLM 620 along or parallel to light path (a).

TIR prisms 608 and 610 are optically coupled between lens system 606 and SLM 620 along light path (a). Each TIR prism 608-610 provides total internal reflection when the angle of incidence of a light beam is greater than the critical angle. For example, a light beam directed along light path (b) is internally reflected off a surface of TIR prism 610 and redirected along light path (c). However, another surface of TIR prism 610 transmits light beams directed along light path (a) toward SLM 620. Light beams transmitted along light path (c) are at an angle relative to another surface of TIR prism 610 that causes them to be transmitted toward freeform eyepiece 650. In some examples, a fold mirror may be used in place of, or in addition to, either TIR prism 608 or TIR prism 610. In some systems, axial color can be corrected by changing the material of TIR prism 610 (e.g., to create abbe number difference between the freeform eyepiece 650 and TIR prism 610). The correction of axial color may improve the image performance for some systems.

As shown in FIG. 6A, freeform eyepiece 650 may be configured such that surface 652 has a maximum end-to-end length greater than the maximum end-to-end length of surface 653. In addition, freeform eyepiece 650 may be configured such that surface 653 has a greater end-to-end maximum length than that of surface 651. As shown in FIG. 6A, freeform eyepiece 650 and SLM 620 may be optically coupled (via TIR prism 610), such that a minimum distance between surface 652 and SLM 620 may be less than a minimum distance between surface 653 and SLM 620.

FIGS. 6A-6B further illustrate certain example edge-to-edge dimensions of freeform eyepiece 650. From the perspective of FIG. 6A, freeform eyepiece 650 has a maximum height (indicated by dimension 656 along the y-axis) of approximately 6.4 mm and a length (indicated by dimension 655 along the x-axis) of approximately 7.0 mm. From the perspective of FIG. 6B, freeform eyepiece 650 has a horizontal width (indicated by dimension 657 along the z-axis) of approximately 6.0 mm.

In some systems, a freeform eyepiece 650 configured as shown in FIGS. 6A-6B may enable a near eye display having, for example, a diagonal field of view of at least 40 degrees at a 4×3 aspect ratio, an aperture at f/3.2 that is telecentric at an image plane (e.g., at a surface of SLM 620), a pupil size (as transmitted by freeform eyepiece 650) of at least 2.5 mm, a negative distortion within the range of −5.5% to zero, and a MTF less than 20% at 93 lp/mm for the full field of view.

The controlled manipulation of light beams by freeform eyepiece 650 may be described in further detail with reference to representative light paths (c)-(e) shown in FIG. 6A. As explained previously, TIR prism 610 directs light beams along, or approximately parallel to, light path (c) toward a first surface 651 of freeform eyepiece 650. The first surface 651 has an extended polynomial shape that is configured to receive and transmit light beams along light path (c). Freeform eyepiece 650 also has a second surface 652 having an extended polynomial shape configured to receive light beams transmitted along light path (c). Because the incident angle of light path (c) relative to surface 652 is greater than the critical angle of surface 652, surface 652 internally reflects the received light beams along, or approximately parallel to, light path (d). Freeform eyepiece 650 also has a third surface 653 having a biconic zernike shape and configured to receive light beams transmitted along, or approximately parallel to, light path (d) and reflect the received light beams along, or approximately parallel to, light path (e). Because the incident angle of light path (e) relative to surface 652 is less than the critical angle of surface 652, the light beams transmitted along (or parallel to) light path (e) are transmitted through surface 652. As shown in FIG. 6A, surface 652 may further operate to concentrate the light beams transmitted therethrough. Thus, light beams transmitted into freeform eyepiece 650 are internally reflected multiple times (twice in this example) within freeform eyepiece 650 before exiting freeform eyepiece 650 at an angle different from the incident angle and with a more concentrated focus.

Figure 7B:
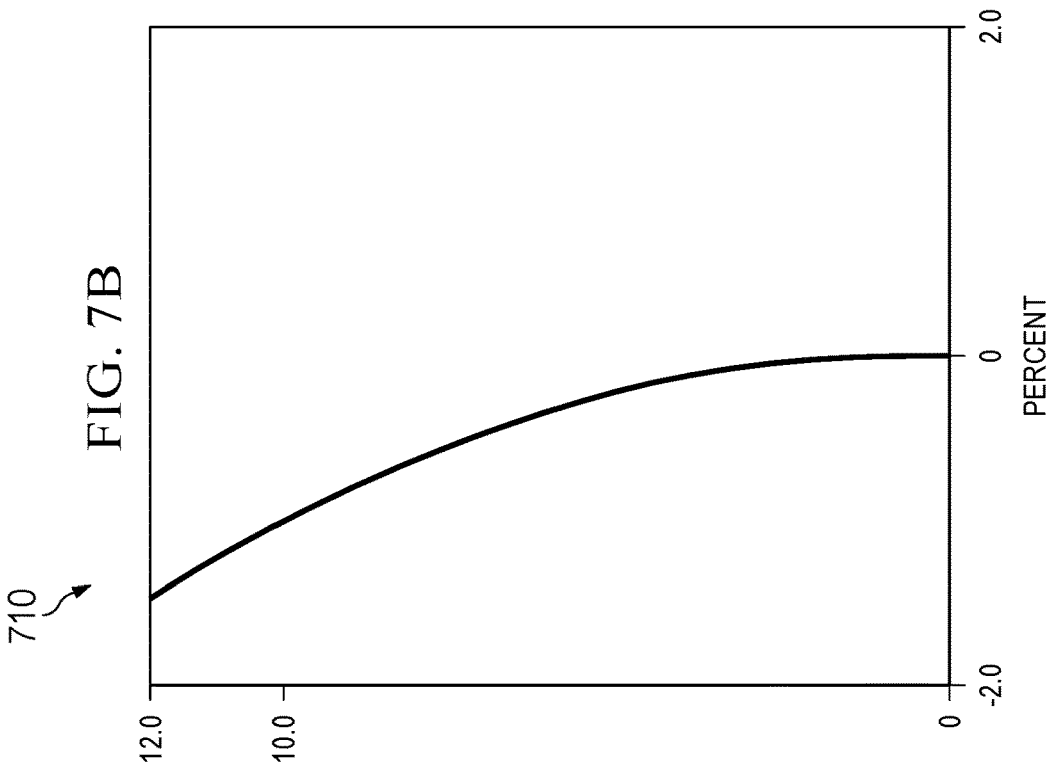
FIGS. 7A-7B are example field curvature and distortion plots, respectively, of an image projected by the optical components shown in FIGS. 3A-3B.
Figure 7A:
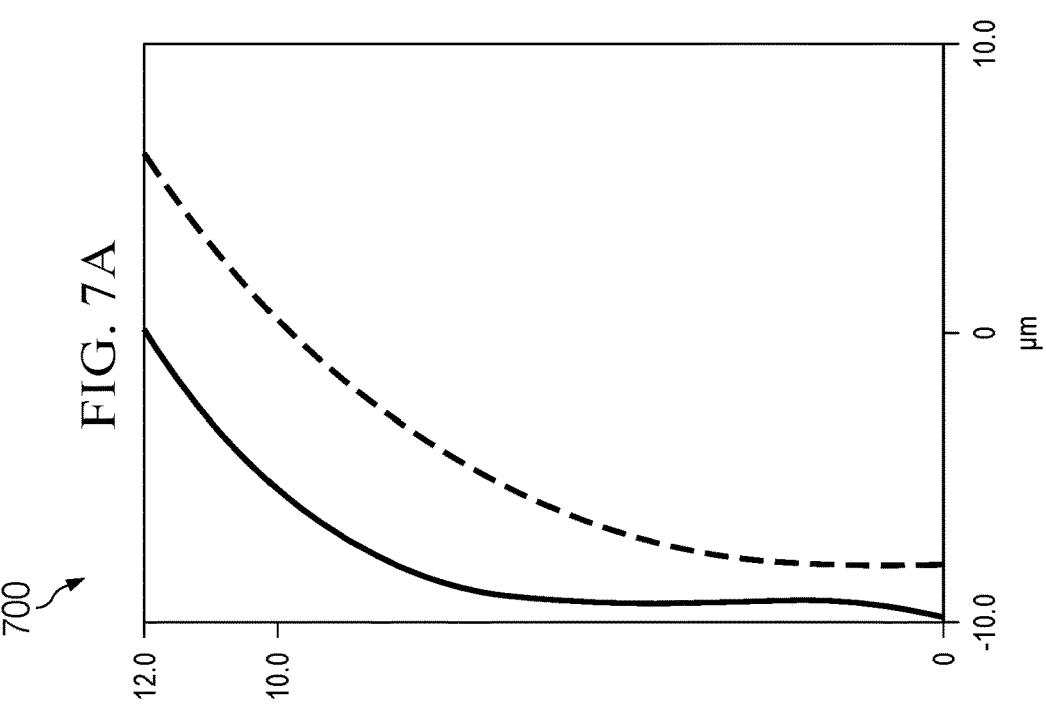

FIGS. 7A-7B are example field curvature and distortion plots, 700 and 710 respectively, of an image (having rectangular dimensions of 6.66 mm×4.56 mm) projected by the example optical components shown in FIGS. 3A-3B. In plot 700, the x-axis represents field distortion in microns (μm), the y-axis represents field degrees from zero to 20 (of a 40×30 degree field), and the 0 mm vertical line represents what a projected image theoretically would look like if it had zero field curvature. The solid line of plot 700 is the tangential field curvature at a wavelength of approximately 0.5876 μm, while the dotted line is the sagittal field curvature at the same wavelength. In plot 710, the x-axis represents the percentage of distortion, the y-axis represents field degrees, and the 0 percent vertical line represents what a projected image theoretically would look like if it had no distortion. The curve shown in plot 710 indicates tangential distortion, with a negative distortion within the range of −8.8% to zero.

Figure 8B:
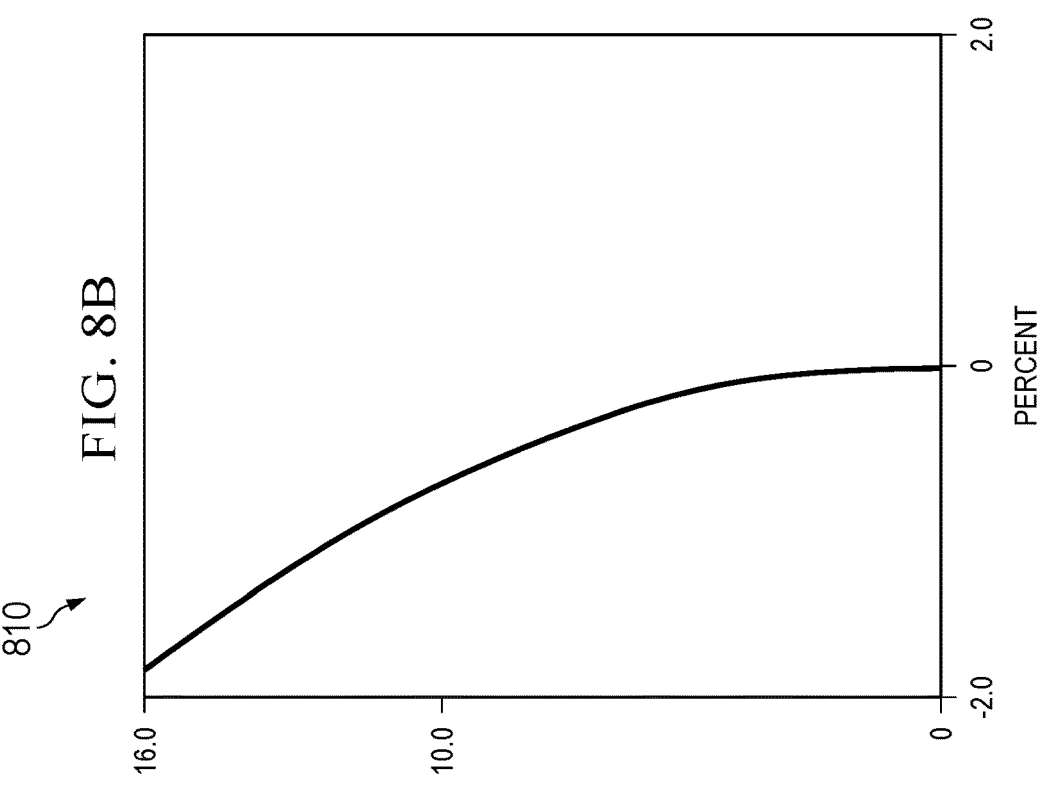
FIGS. 8A-8B are example field curvature and distortion plots, respectively, of an image projected by the optical components shown in FIGS. 4A-4B.
Figure 8A:
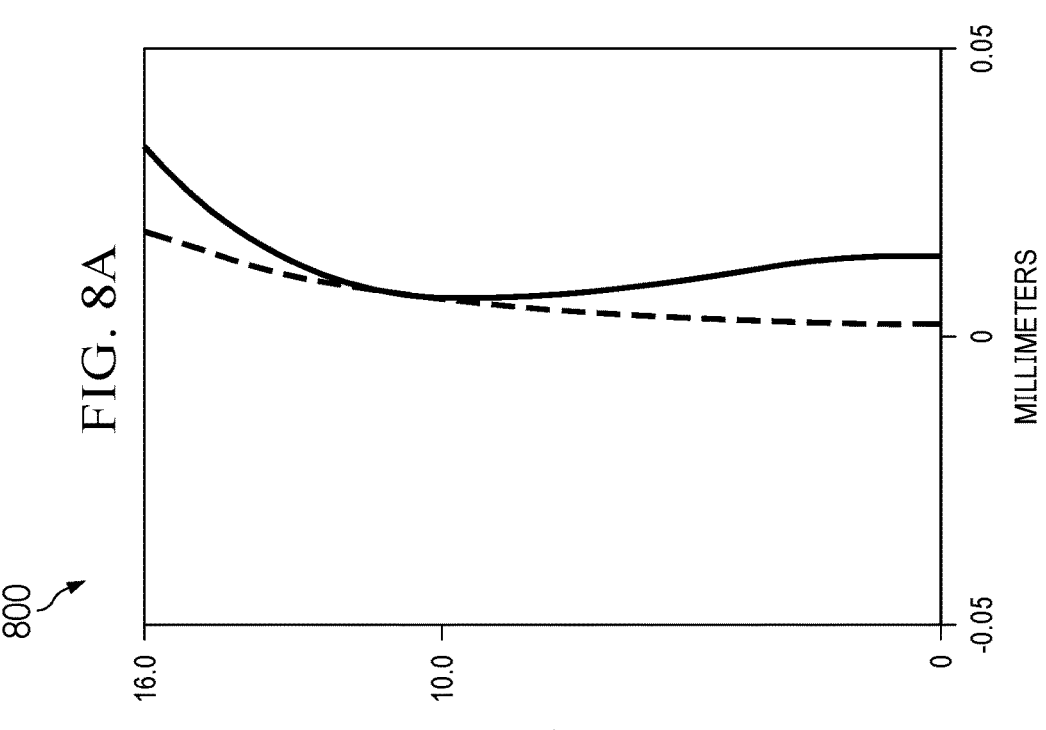

FIGS. 8A-8B are example field curvature and distortion plots, 800 and 810 respectively, of an image (having rectangular dimensions of 6.66 mm×4.50 mm) projected by the example optical components shown in FIGS. 4A-4B. In plot 800, the x-axis represents field distortion in microns (μm), the y-axis represents field degrees from zero to 25 (of a 40×30 degree field), and the 0 mm vertical line represents what a projected image theoretically would look like if it had zero field curvature. Plot 800 shows slight variation between curves at red, green, and blue wavelengths (at approximately 0.6563 μm, 0.5876 μm, 0.4861 μm, respectively). The three solid curves (merging at approximately 0 mm at 0 degrees) represent the tangential field curvature for red, green, and blue wavelengths, while the dotted curves represent the sagittal field curvature for red, green, and blue wavelengths. In plot 810, the x-axis represents the percentage of distortion, the y-axis represents field degrees, and the 0 percent vertical line represents what a projected image theoretically would look like if it had no distortion. The curve shown in plot 810 indicates tangential distortion, with a maximum distortion of approximately −8.1%.

Figure 9B:
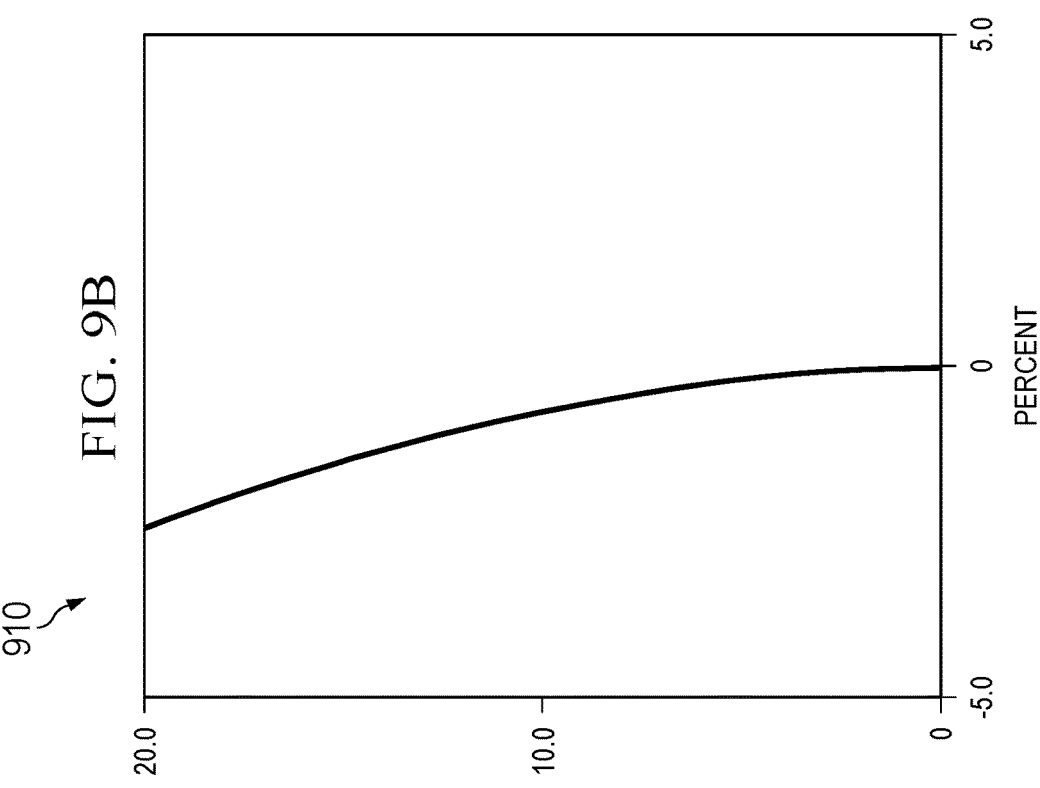
FIGS. 9A-9B are example field curvature and distortion plots, respectively, of an image projected by the optical components shown in FIGS. 5A-5B.
Figure 9A:
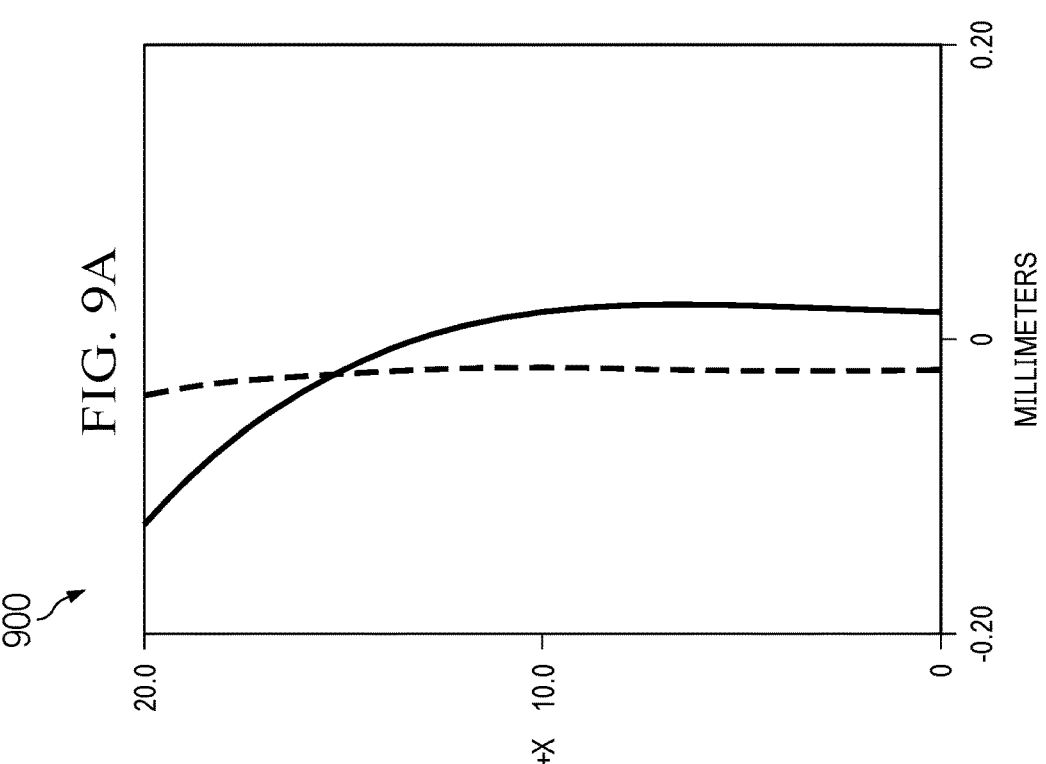

FIGS. 9A-9B are example field curvature and distortion plots, 900 and 910 respectively, of an image (having rectangular dimensions of 4.77 mm×3.41 mm) projected by the example optical components shown in FIGS. 5A-5B. In plot 900, the x-axis represents field distortion in microns (μm), the y-axis represents field degrees from zero to 12 (of a 32×24 degree field), and the 0 mm vertical line represents what a projected image theoretically would look like if it had zero field curvature. The solid line of plot 900 is the tangential field curvature at a wavelength of approximately 0.5876 μm, while the dotted line is the sagittal field curvature at the same wavelength. In plot 910, the x-axis represents the percentage of distortion, the y-axis represents field degrees, and the 0 percent vertical line represents what a projected image theoretically would look like if it had no distortion. The curved line shown in plot 710 indicates tangential distortion, with a maximum distortion of approximately −5.9%.

Figure 10B:
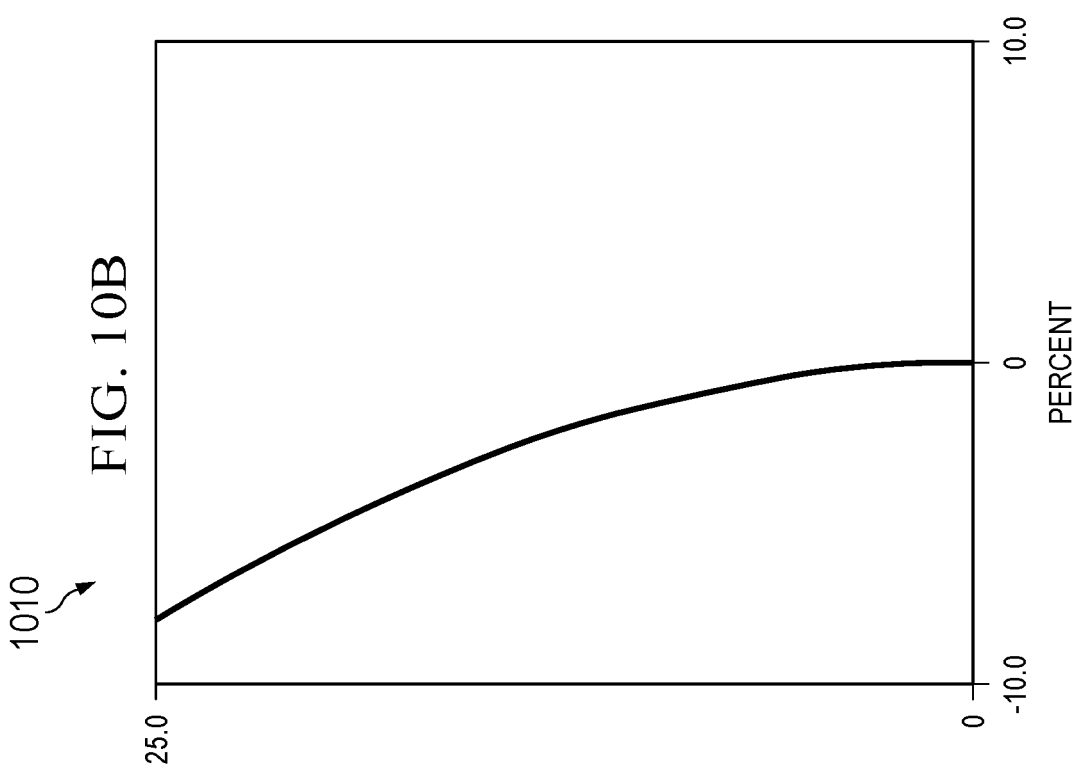
FIGS. 10A-10B are example field curvature and distortion plots, respectively, of an image projected by the optical components shown in FIGS. 6A-6B.
Figure 10A:
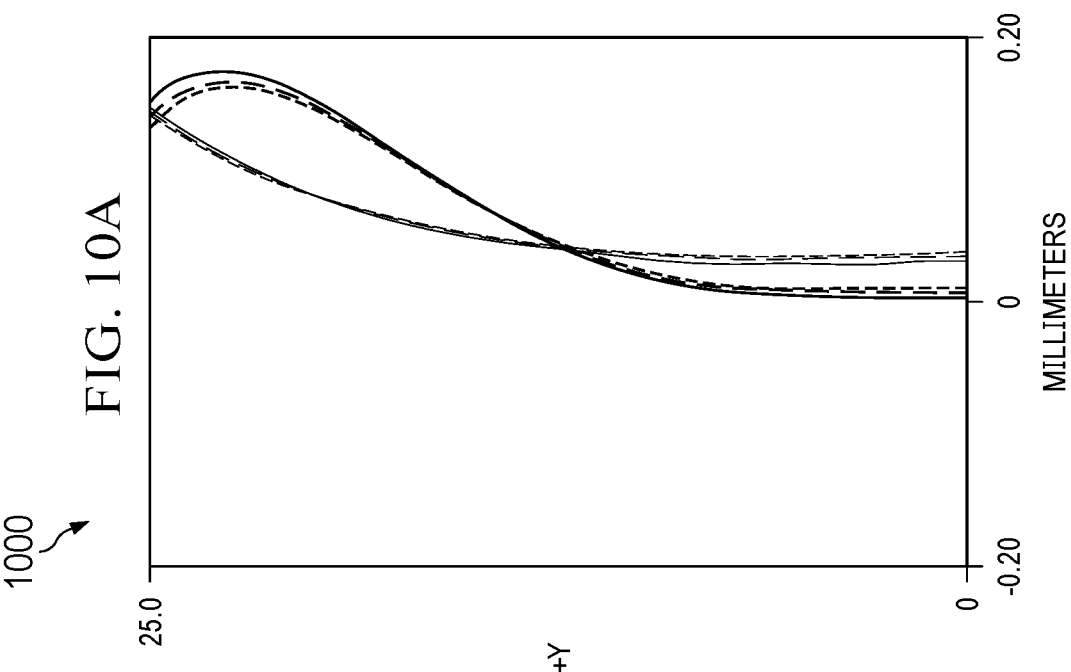

FIGS. 10A-10B are example field curvature and distortion plots, 1000 and 1100 respectively, of an image (having rectangular dimensions of 4.69 mm×3.36 mm) projected by the example optical components shown in FIGS. 6A-6B. In plot 1000, the x-axis represents field distortion in microns (μm), the y-axis represents field degrees from zero to 12 (of a 32×24 degree field), and the 0 mm vertical line represents what a projected image theoretically would look like if it had zero field curvature. The solid line on the left of plot 1000 is the tangential field curvature at a wavelength of approximately 0.5876 μm, while the dotted line on the right is the sagittal field curvature at the same wavelength. In plot 1010, the x-axis represents the percentage of distortion, the y-axis represents field degrees, and the 0 percent vertical line represents what a projected image theoretically would look like if it had no distortion. The curve shown in plot 1010 indicates tangential distortion, with a negative distortion of approximately −5.5%.

Herein, "or" is inclusive and not exclusive, unless expressly indicated otherwise or indicated otherwise by context. Therefore, herein, "A or B" means "A, B, or both,"

unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. To aid the Patent Office, and any readers of any patent issued on this application, in interpreting the claims appended hereto, applicant notes that there is no intention that any of the appended claims invoke paragraph 6 of 35 U.S.C. § 112 as it exists on the date of filing hereof unless the words "means for" or "step for" are explicitly used in the claim language.

In the foregoing descriptions, for purposes of explanation, numerous specific details are set forth to provide a thorough understanding of one or more examples. However, this disclosure may be practiced without some or all these specific details, as will be evident to one having ordinary skill in the art. In other instances, well-known process steps or structures have not been described in detail in order not to unnecessarily obscure this disclosure. In addition, while the disclosure is described in conjunction with example examples, this description is not intended to limit the disclosure to the described examples. To the contrary, the description is intended to cover alternatives, modifications, and equivalents as may be included within the spirit and scope of the disclosure as defined by the appended claims.

What is claimed is:

1. A display system, comprising:
   a light source configured to emit a light beam;
   a spatial light modulator configured to receive and spatially modulate the light beam;
   a total internal reflection (TIR) prism having a first face, a second face, and a third face, the TIR prism configured to receive the spatially modulated light beam through the first face, direct the spatially modulated light beam to the second face, redirect the spatially modulated light beam from the second face to the first face, and redirect the spatially modulated light beam from the first face through the third face;
   a freeform eyepiece having a one-piece, solid, rotationally-asymmetric shape including first, second, and third surfaces, the freeform eyepiece configured to:
      receive through the first surface the spatially modulated light beam redirected by the TIR prism;
      internally reflect the spatially modulated light beam off the second surface toward the third surface;
      internally reflect the spatially modulated light beam off the third surface toward the second surface; and
      transmit the spatially modulated light beam through the second surface, the transmission of the spatially modulated light beam through the second surface concentrating the spatially modulated light beam; and
   a waveguide configured to receive the light beam transmitted by the freeform eyepiece and transmit the received light beam to a reflective surface of a wearable eye lens,
   wherein at least one of:
      the first surface of the freeform eyepiece has an extended polynomial shape convex with respect to an exterior,
      the second surface of the freeform eyepiece has an extended polynomial shape convex with respect to the exterior, and
      the third surface of the freeform eyepiece has a biconic Zernike shape.

2. The display system of claim 1, wherein the display system is a wearable near eye display system.

3. The display system of claim 1, wherein:

the second surface has a maximum end-to-end length greater than a maximum end-to-end length of the third surface; and a minimum distance between the third surface and the spatial light modulator is less than a minimum distance between the second surface and the spatial light modulator.

4. The display system of claim 1, wherein:

the second surface has a maximum end-to-end length greater than a maximum end-to-end length of the third surface; and a minimum distance between the second surface and the spatial light modulator is less than a minimum distance between the third surface and the spatial light modulator.

5. The display system of claim 1, wherein the TIR prism is a first TIR prism and further comprising a second TIR prism configured to receive and internally reflect the spatially modulated light beam transmitted through the second surface.

6. An eyepiece comprising:

first, second and third surfaces at least partially defining the one-piece shape, in which the first surface has an extended polynomial shape convex with respect to an exterior, the second surface has an extended polynomial shape convex with respect to the exterior, and the third surface has a biconic Zernike shape, in which the first surface is configured to receive a spatially modulated light beam, the second surface is configured to internally reflect the spatially modulated light beam toward the third surface, the third surface is configured to reflect the spatially modulated light beam toward and through the second surface, wherein transmission of the spatially modulated light beam through the second surface concentrates the spatially modulated light beam, wherein the first, second, and third surfaces define a structure that is of one-piece and rotationally asymmetric.

7. The eyepiece of claim 6, wherein the eyepiece comprises plastic.

8. The eyepiece of claim 6, wherein the eyepiece comprises glass.

9. The eyepiece of claim 6, wherein the eyepiece is injection molded.

10. The eyepiece of claim 6, wherein the eyepiece is machined.

11. The eyepiece of claim 6, wherein the second surface has a maximum end-to-end length greater than a maximum end-to-end length of the third surface.

12. The eyepiece of claim 6, wherein the eyepiece has a height within a range of 6.8 mm to 9.3 mm and a width within a range of 7.7 mm to 9.3 mm.

13. The eyepiece of claim 6, wherein the spatially modulated light beam concentrated and transmitted by the eyepiece has a diagonal field of view of at least 40 degrees.

14. The eyepiece of claim 6, wherein the spatially modulated light beam concentrated and transmitted by the eyepiece has a negative distortion within the range of –8.8% to zero.

15. The eyepiece of claim 6, wherein the spatially modulated light beam concentrated and transmitted by the eyepiece has a negative distortion within the range of –8.2% to zero.

16. The eyepiece of claim 6, wherein the spatially modulated light beam concentrated and transmitted by the eyepiece has a negative distortion within the range of –2.0% to zero.

17. A display system, comprising:

a total internal reflection (TIR) prism having a first face, a second face, and a third face, the TIR prism configured to receive a light beam through the first face, direct the spatially modulated light beam to the second face, redirect the spatially modulated light beam from the second face to the first face, and redirect the spatially modulated light beam from the first face through the third face;

a spatial light modulator optically coupled to the TIR prism and configured to receive and spatially modulate the light beam redirected by the TIR prism; and a freeform eyepiece having a one-piece, solid, rotationally-asymmetric shape including first, second, and third surfaces, the freeform eyepiece optically coupled to the spatial light modulator and configured to:

receive through the first surface the spatially modulated light beam;

internally reflect the spatially modulated light beam off the second surface toward the third surface;

internally reflect the spatially modulated light beam off the third surface toward the second surface; and transmit the spatially modulated light beam through the second surface, the transmission of the spatially modulated light beam through the second surface concentrating the spatially modulated light beam wherein at least one of:

the first surface of the freeform eyepiece has an extended polynomial shape convex with respect to an exterior, the second surface of the freeform eyepiece has an extended polynomial shape convex with respect to the exterior, and the third surface of the freeform eyepiece has a biconic Zernike shape.

18. The display system of claim 17, wherein:

the second surface has a maximum end-to-end length greater than a maximum end-to-end length of the third surface; and a minimum distance between the third surface and the spatial light modulator is less than a minimum distance between the second surface and the spatial light modulator.

19. The display system of claim 17, wherein:

the second surface has a maximum end-to-end length greater than a maximum end-to-end length of the third surface; and a minimum distance between the second surface and the spatial light modulator is less than a minimum distance between the third surface and the spatial light modulator.

20. The display system of claim 17, wherein the display system is a wearable near eye display system.

* * * * *